US012124766B2

(12) United States Patent
Gossain et al.

(10) Patent No.: US 12,124,766 B2
(45) Date of Patent: Oct. 22, 2024

(54) NETWORKING IN A MEDIA PLAYBACK SYSTEM

(71) Applicant: Sonos, Inc., Santa Barbara, CA (US)

(72) Inventors: Hrishikesh Gossain, Santa Barbara, CA (US); Lawrence Stefani, Andover, MA (US); Benjamin Rappoport, Santa Barbara, CA (US)

(73) Assignee: Sonos Inc., Goleta, CA (US)

( * ) Notice: Subject to any disclaimer, the term of this patent is extended or adjusted under 35 U.S.C. 154(b) by 315 days.

(21) Appl. No.: 17/513,228

(22) Filed: Oct. 28, 2021

(65) Prior Publication Data

US 2022/0129238 A1 Apr. 28, 2022

Related U.S. Application Data

(60) Provisional application No. 63/106,715, filed on Oct. 28, 2020.

(51) Int. Cl.
*G06F 3/16* (2006.01)
(52) U.S. Cl.
CPC .................................. *G06F 3/165* (2013.01)
(58) Field of Classification Search
CPC ........ G06F 3/165; G06F 3/167; G06F 1/3209; H04L 65/1094; H04L 65/611; H04W 84/12; H04R 2227/003; H04R 2227/005; H04R 27/00; Y02D 30/70; G10L 15/22
See application file for complete search history.

(56) References Cited

U.S. PATENT DOCUMENTS

| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Phung-Hoang J Nguyen
(74) *Attorney, Agent, or Firm* — Finch & Maloney PLLC

(57) ABSTRACT

Examples described herein involve networking in a media playback system. In one aspect, an access point may prevent two or more grouped playback devices from being steered to different networks. In another aspect, an access point may operate as a sleep proxy for a playback device. In a third aspect, an example system may include a fixture configured to receive a bulb. Example bulbs include sound bulbs with one or more audio transducers and access point bulbs, among other examples.

20 Claims, 24 Drawing Sheets

(56) References Cited

U.S. PATENT DOCUMENTS

| | | | |
|---|---|---|---|
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,549,429 | B1* | 1/2017 | Gudell .................. H04W 12/06 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2013/0022221 | A1* | 1/2013 | Kallai ..................... H04S 7/302 381/300 |
| 2015/0082355 | A1* | 3/2015 | Tiddens ........... H04N 21/43637 725/48 |
| 2019/0097886 | A1* | 3/2019 | D'Amato ............. H04W 8/005 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

\* cited by examiner

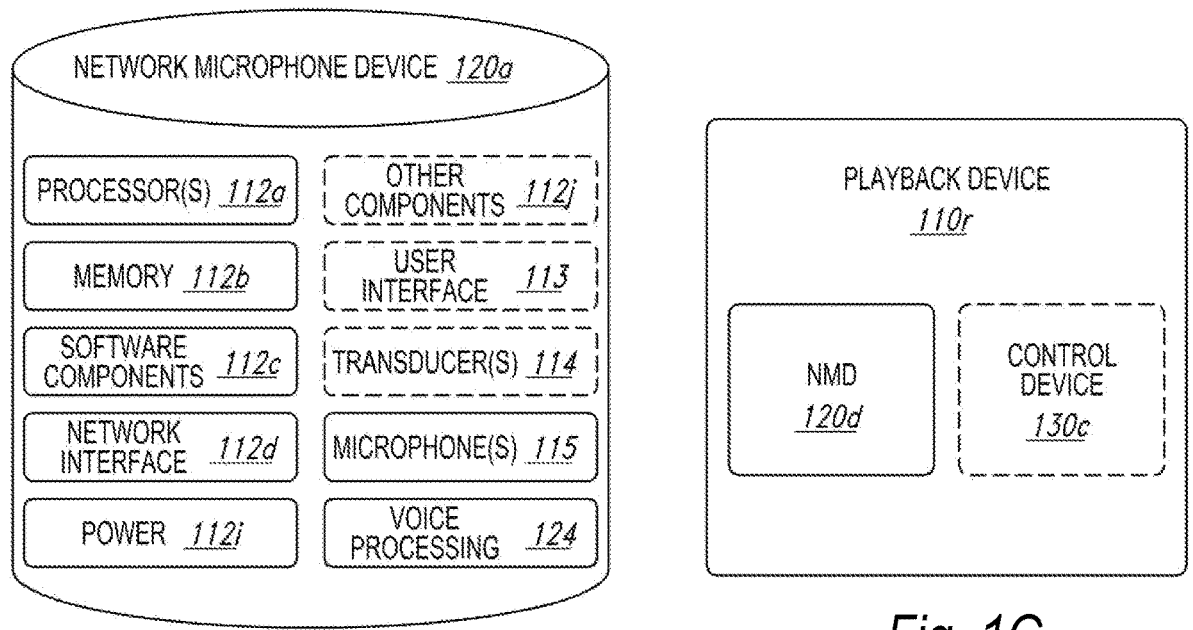
Fig. 1F
Fig. 1G
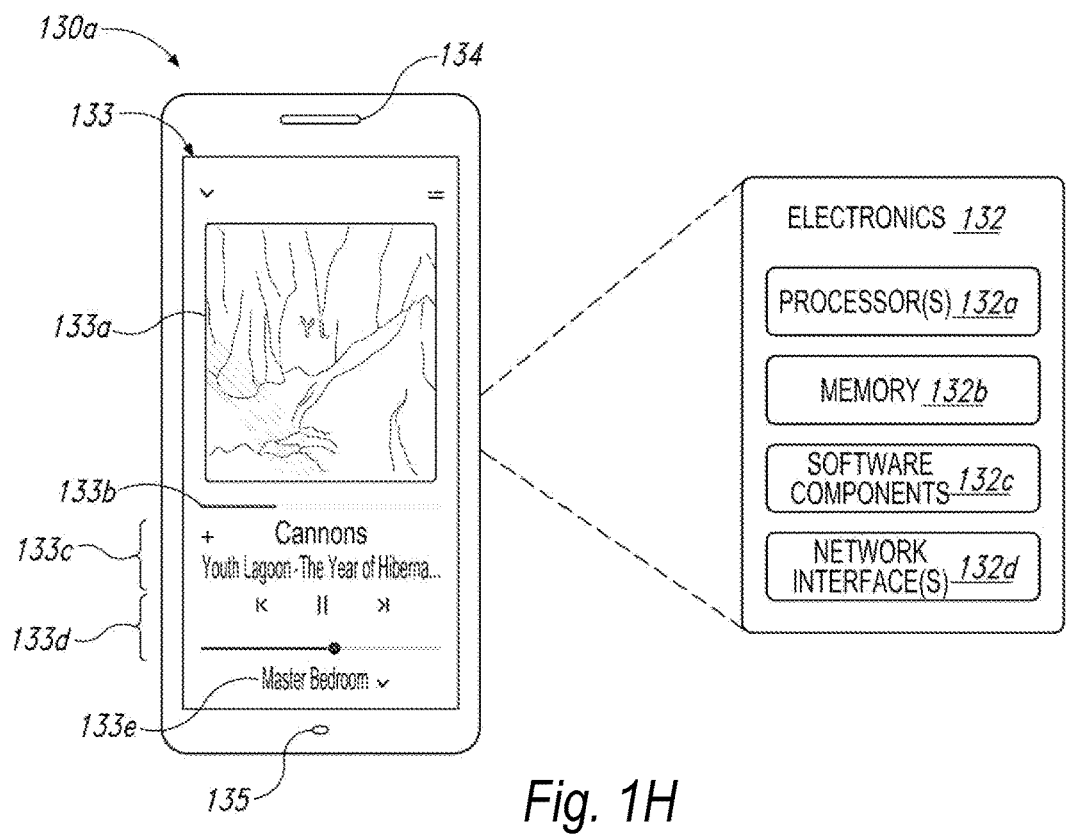
Fig. 1H

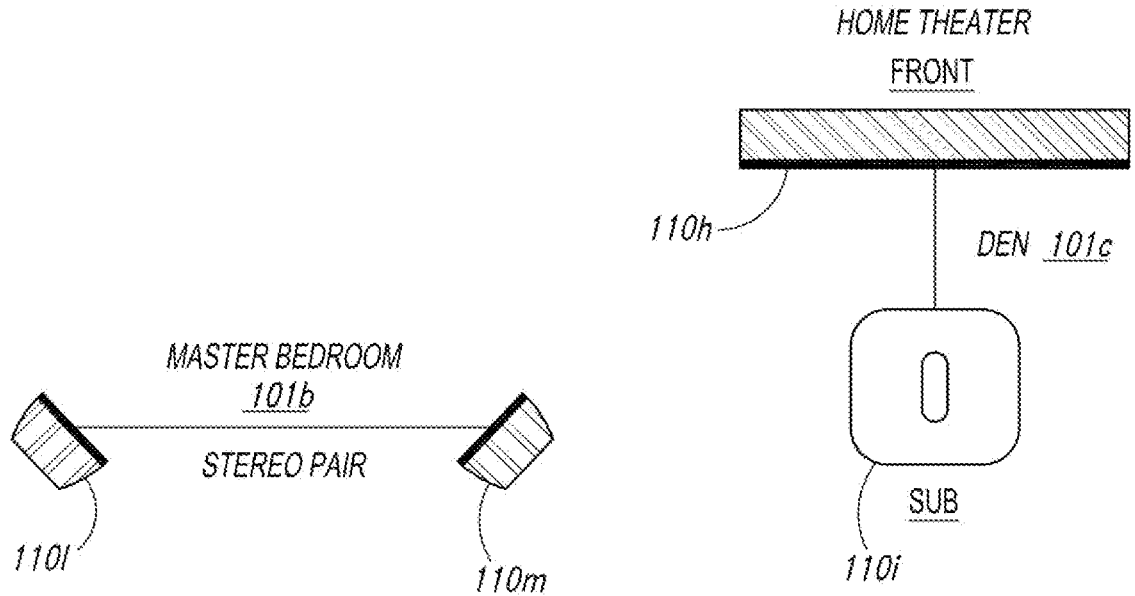
Fig. 1I
Fig. 1J
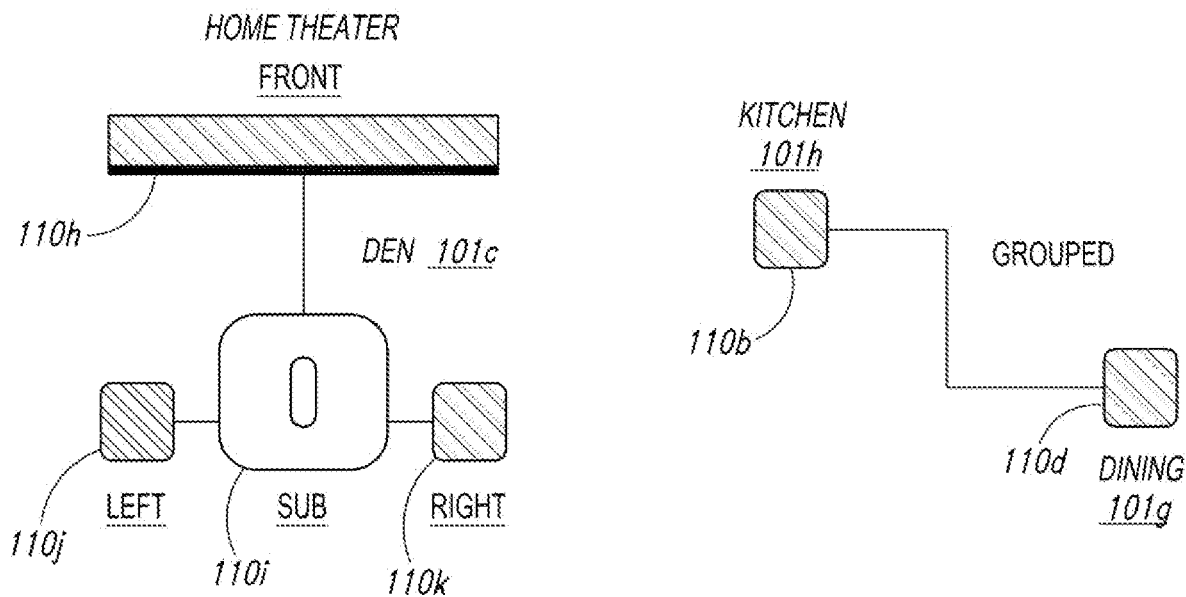
Fig. 1K
Fig. 1L

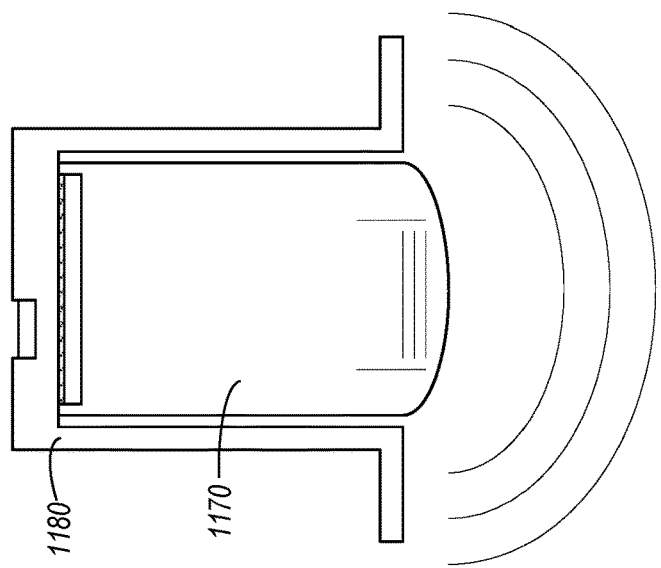
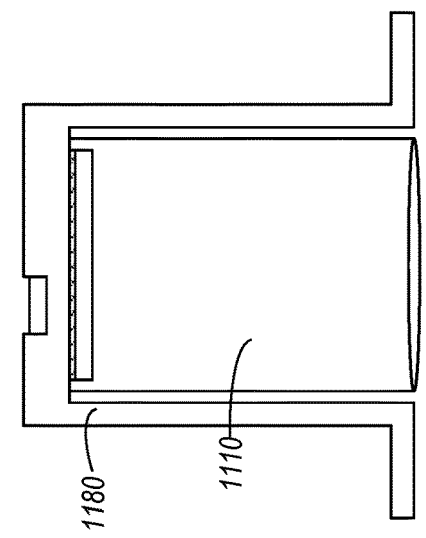
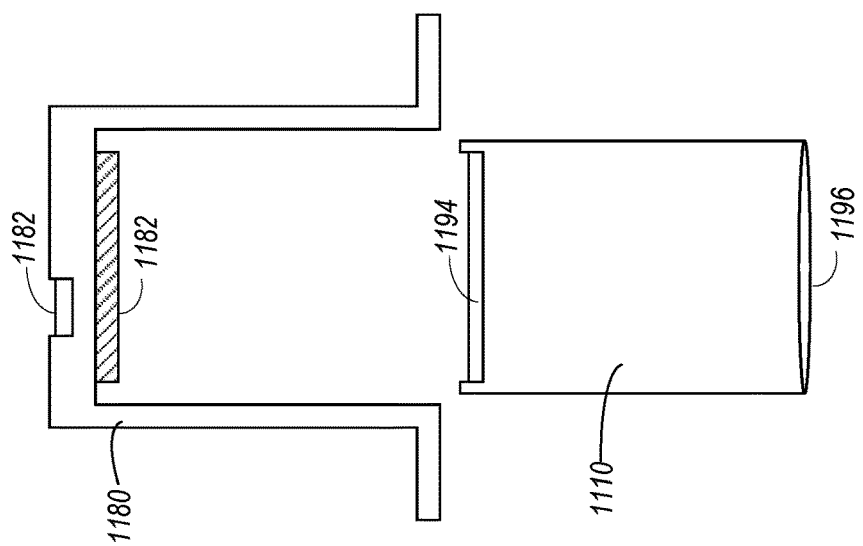
Fig. 11C
Fig. 11B
Fig. 11A

NETWORKING IN A MEDIA PLAYBACK SYSTEM

CROSS-REFERENCE TO RELATED APPLICATIONS

This application claims priority to U.S. Patent Application Ser. No. 63/106,715, filed on Oct. 28, 2020, the disclosure of which is incorporated by reference herein in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partial schematic diagram of a control device.

FIGS. 1-I through 1L are schematic diagrams of corresponding media playback system zones.

FIG. 11A is a diagram illustrating an example fixture and bulb in accordance with aspects of the disclosed technology.

FIG. 11B is another diagram illustrating the example fixture and bulb in accordance with aspects of the disclosed technology.

FIG. 11C is a diagram illustrating the example fixture and another bulb in accordance with aspects of the disclosed technology.

Figure 1A:
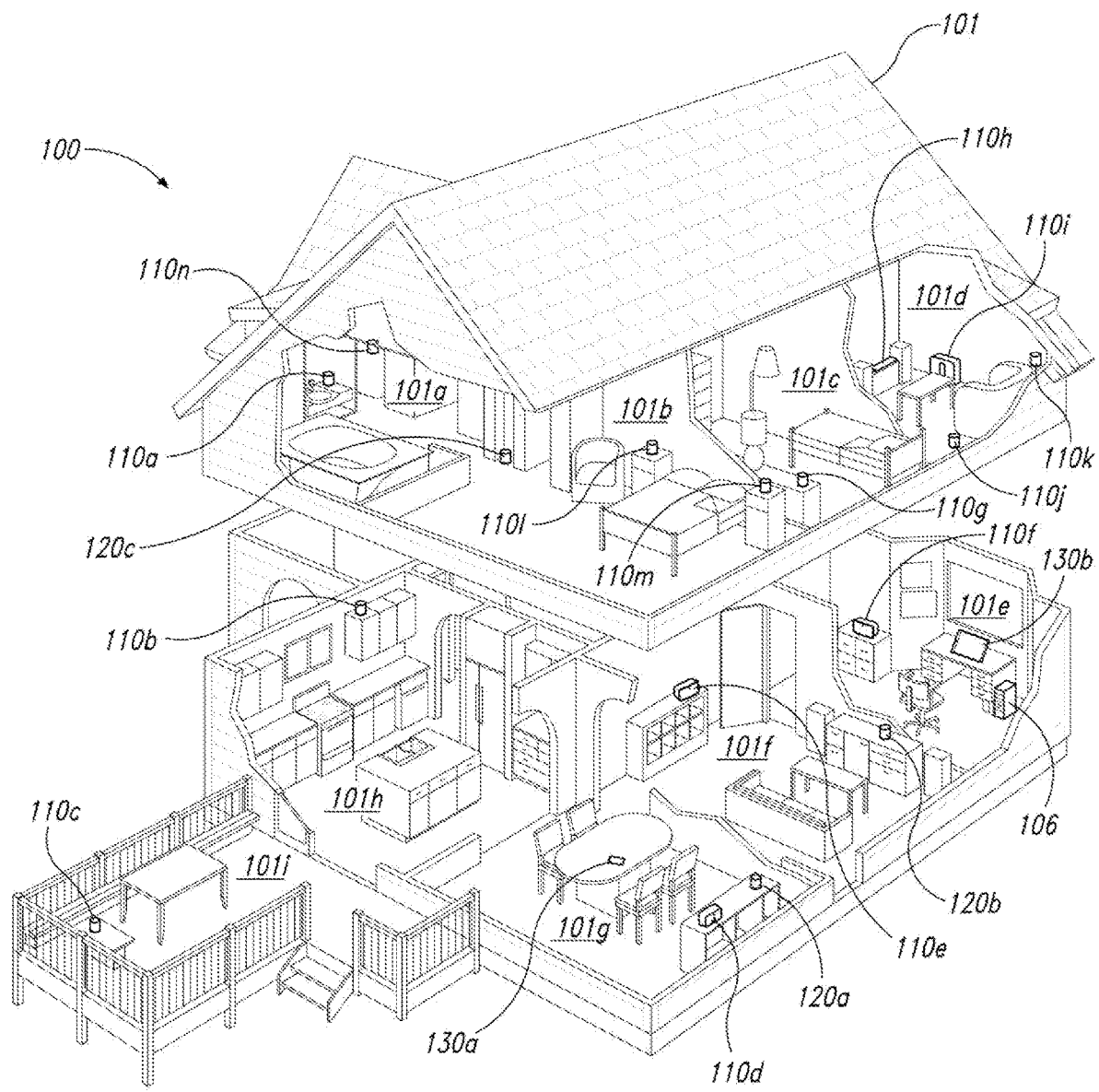
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

An example media playback system, such as the media playback system 100 (FIG. 1A) may include multiple playback devices that coordinate with one another to play audio. For instance, two or more playback devices may form a bonded zone (FIGS. 1I to 1K), such as a stereo pair, to play back respective channels of audio content in synchrony. As another example, playback devices in two or more zones may join together as a synchrony group to play back the same content in synchrony (FIG. 1L). The playback devices may communicate with one another over a network (e.g., a wired or wireless local area network) to carry out such features.

As the home becomes more connected and the number of wireless clients (e.g., smartphones, laptops, network microphone devices, IoT devices, etc.) grows, wireless networking equipment has become more complicated to handle the increased demands. Some users may deploy routers with multiple radios providing multiple networks on different bands and/or channels. Yet further, some users may deploy systems with multiple access points, which may each provide one or more networks. For instance, some users may opt for a mesh networking system with multiple mesh access points providing one or more wireless networks.

Such wireless access points may employ steering algorithms to distribute the client devices among the multiple networks in order to balance the load among the multiple networks and different bands and/or channels. In some cases, such algorithms may steer bonded and/or grouped playback devices to different access points. While such steering may enhance the connection of an individual playback device to an access point, such steering may slow or prevent communication among bonded and/or grouped playback devices. Ultimately, communications involved in synchronous playback, among other coordinated functions, may be affected.

In various examples, the media playback system 100 and one or more access points may coordinate to connect bonded and/or grouped playback devices to the same access point and wireless network, which may facilitate communication between the pertinent playback devices. Yet further, the access point(s) may maintain the bonded and/or grouped playback devices on the same access point and wireless network, such as by preventing a steering algorithm from separating the pertinent playback devices or by disabling steering altogether for the pertinent playback devices. In some cases, when steering would improve performance, the access point(s) may steer all pertinent playback devices to the same access point, thereby keeping all the pertinent playback devices on the same access point and network.

To save power, example playback devices may employ one or more low-power modes. In such a low-power mode, certain components, such as the main system-on-a-chip and/or audio components, may be suspended or otherwise placed in a state that consumes less power. To wake up, a network interface of a playback device may be configured to recognize a specially-formed packet or packets, which may take the form of a query (e.g., a multicast DNS request or magic packet).

Yet further, example playback devices may be controlled using a number of different protocols. For instance, a SONOS® playback device may be controlled natively by a SONOS® controller (e.g., a SONOS® app on a smartphone or other network device). The playback device may also be controlled using various other streaming protocols, such as AIRPLAY®, SPOTIFY CONNECT®, GOOGLE CAST®, or PANDORA®, using various applications or software. Each of these protocols may have a different "magic" packet that wakes up devices that support its protocol.

In some examples, a playback device supporting more than one of these protocols may listen for multiple types of queries. However, such a configuration may lead to frequent wake ups, as the playback device may wake up whenever a query is broadcast by using any of the protocols by any device on the network. Yet further, to be able discern between the different types of queries, the playback device may keep more components active in the low-power mode in order to perform processing on the wireless communications received via its network interface, which may lead to various issues such as high power consumption.

Within examples, an access point may proxy for one or more playback devices. As a proxy for a playback device, the access point may listen for queries supported by that playback device (e.g., from various supported protocols). When it detects one of the supported queries, the access point may send a particular type of magic packet (e.g. a native magic packet) to the playback device. The playback device monitors for this particular type of magic packet and wakes up when one is received.

Some network interfaces are capable of monitoring for one type of magic packet natively using an onboard processor. If one of these network interfaces is implemented, the playback device may be able to detect the particular type of magic packets using only the network interface. Since the playback device is only monitoring for the particular type of magic packet and not multiple types of queries, more components may be suspended or otherwise placed in a low-power state during the low-power mode. Furthermore, while such proxying may involve some processing, an access point is typically "always-on" so as to function as an access point. As such, proxying for a playback device does not otherwise prevent the access point from going into a low-power mode.

In some examples, an access point may further determine whether a network device is intending to control the playback device before sending the particular magic packet to the playback device so as to wake up the playback device. Some protocols may transmit data indicative of a targeted device after or in conjunction with a query. The access point may monitor these transmissions and determine whether the playback device that is being proxied for is the intended target. If not, the access point may determine not to send the particular magic packet to wake up the playback device. Such determinations may function as a filter to reduce the number of queries reaching the playback device, thereby preventing unnecessary wake-ups and allowing it to stay in the low-power mode more often.

As noted above, in various examples, networking equipment, such as access points (APs), routers, and/or power-over-ethernet (PoE) switches and/or injectors, may be configured for use with a media playback system, such as the media playback system 100 (FIG. 1A). In some examples this network requirement may be manufactured or designed by a third-party in collaboration with a manufacturer or designer of the media playback system. This third-party networking equipment is referred to herein as "partner" components (e.g., partner AP, partner switch). This partner networking equipment and/or the playback devices in the media playback system 110 (e.g., the playback devices 110) may include one or more features to facilitate operation of the media playback system, such as features to prevent steering of bonded playback devices and/or to proxy for a playback device, among other examples.

Yet further, some examples may involve a fixture configured to receive a bulb. The fixture may include a Power-over-Ethernet (PoE) port to receive data and power from a PoE switch. Example bulbs include a sound bulb, which may have similar features to playback devices described herein, except for the form factor. Other types of bulbs may include access point bulbs and IoT bulbs (e.g., a smoke alarm bulb). Within examples, fixtures may be installed in various locations in a home, business, or other locations to allow for installation of bulbs.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices 120 ("NMDs") (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
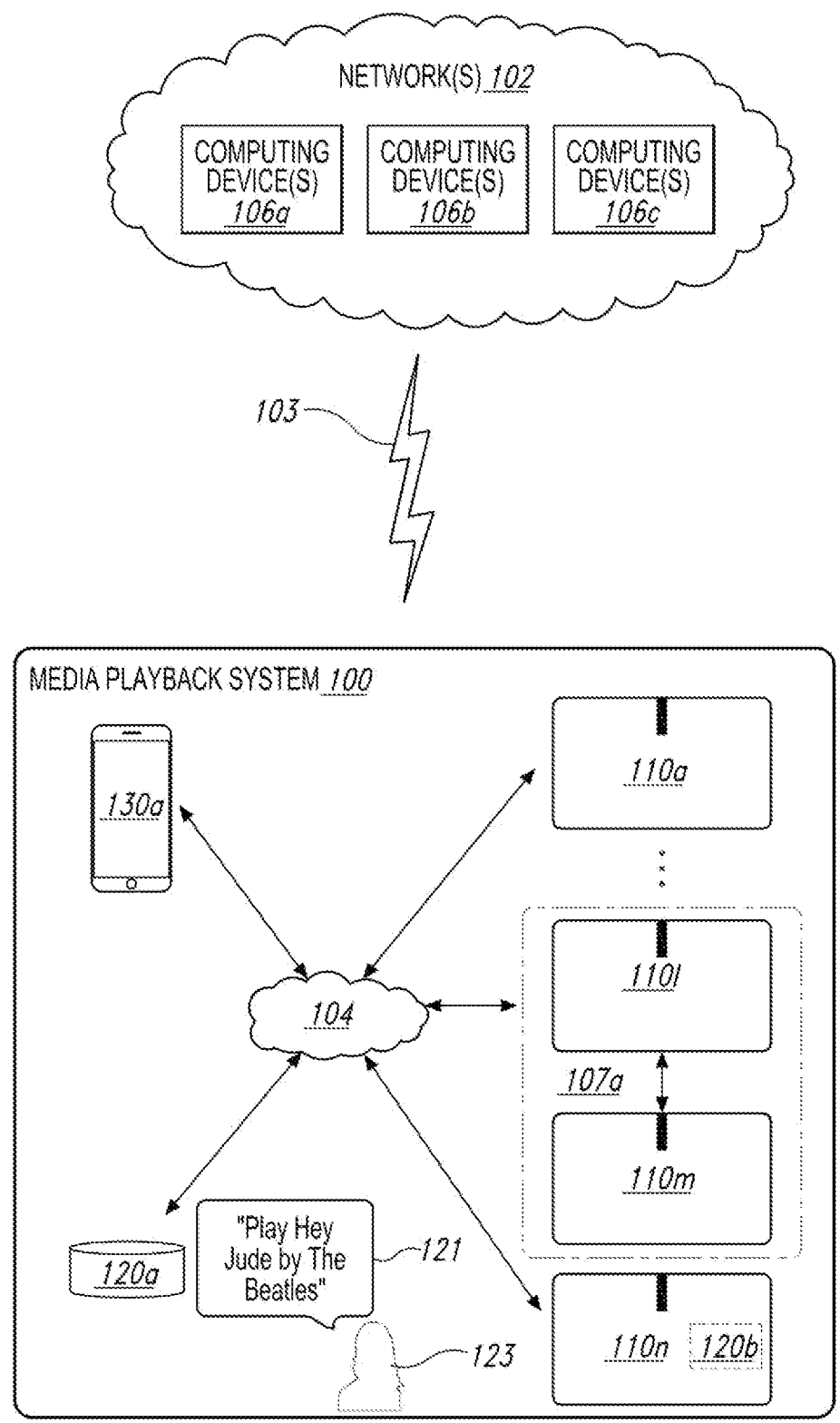
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

Figure 1C:
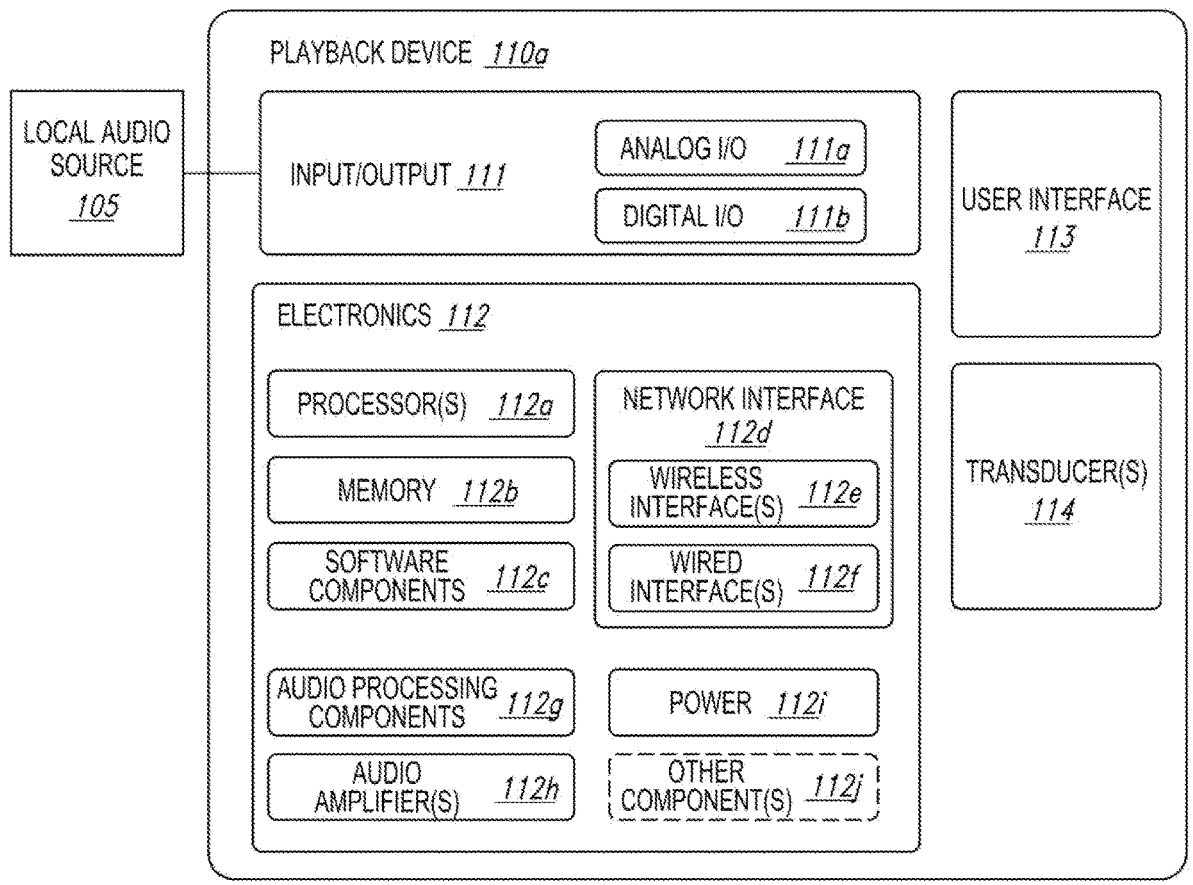
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106*a-c* via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
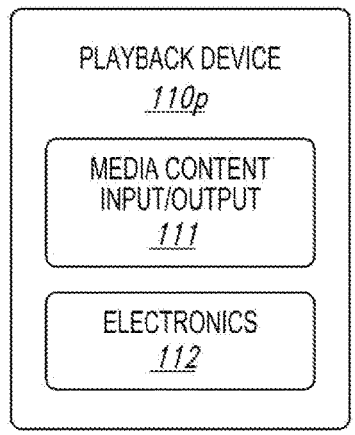
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
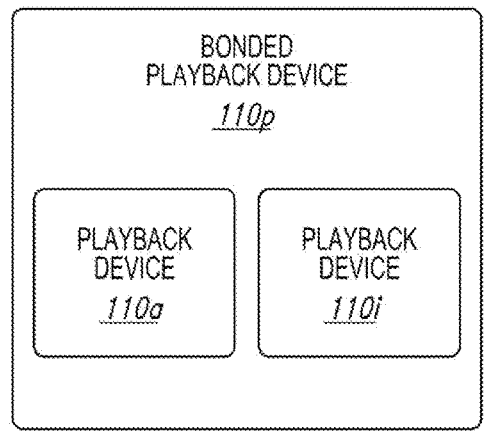
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partial schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.11ax 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
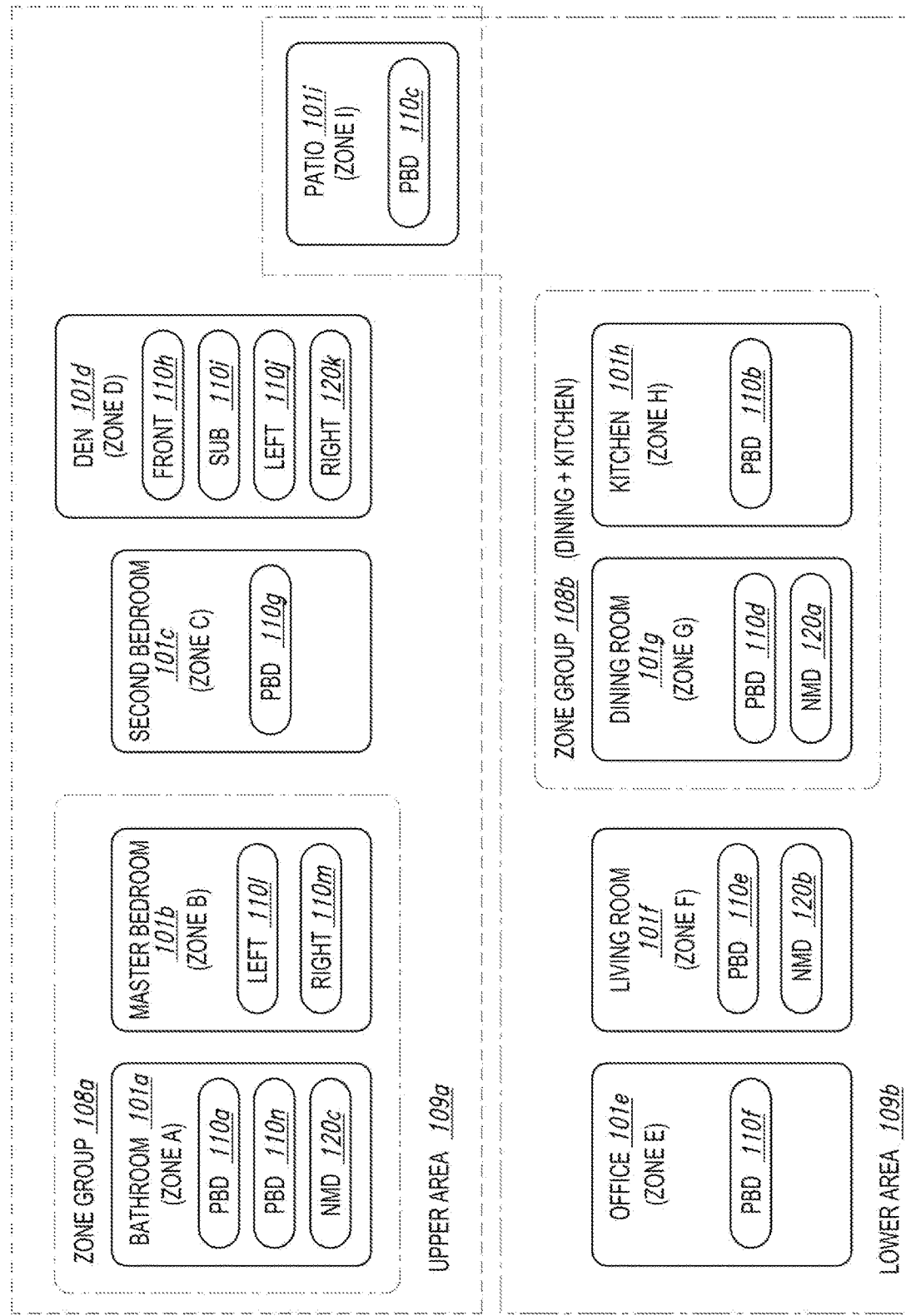
FIG. 1M is a schematic diagram of media playback system areas.

FIGS. 1-1 through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
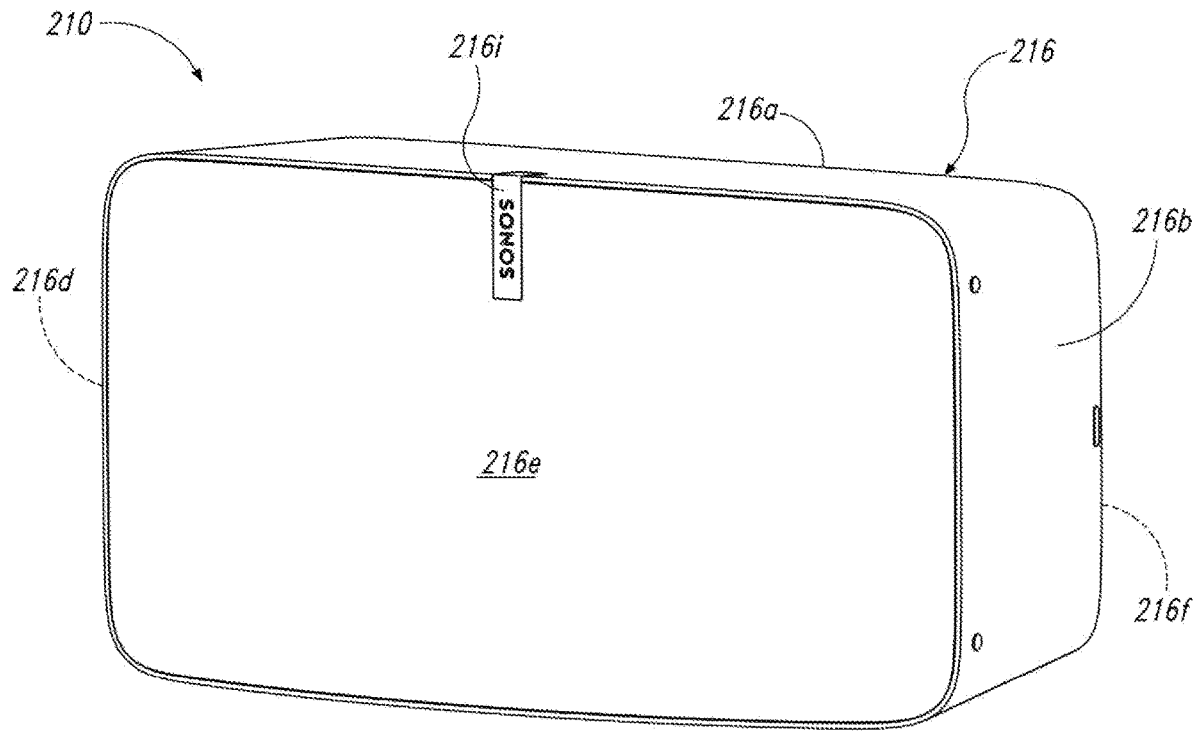
FIG. 2A is a front isometric view of a playback device configured in accordance with aspects of the disclosed technology.
Figure 2B:
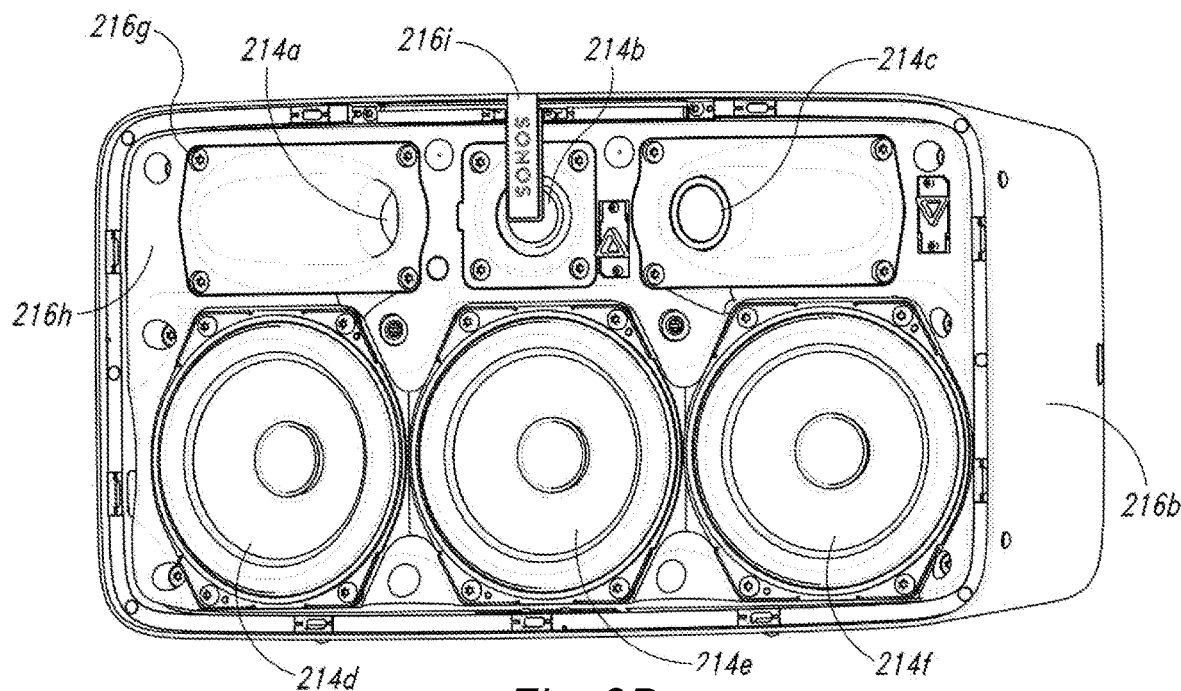
FIG. 2B is a front isometric view of the playback device of FIG. 3A without a grille.
Figure 2C:
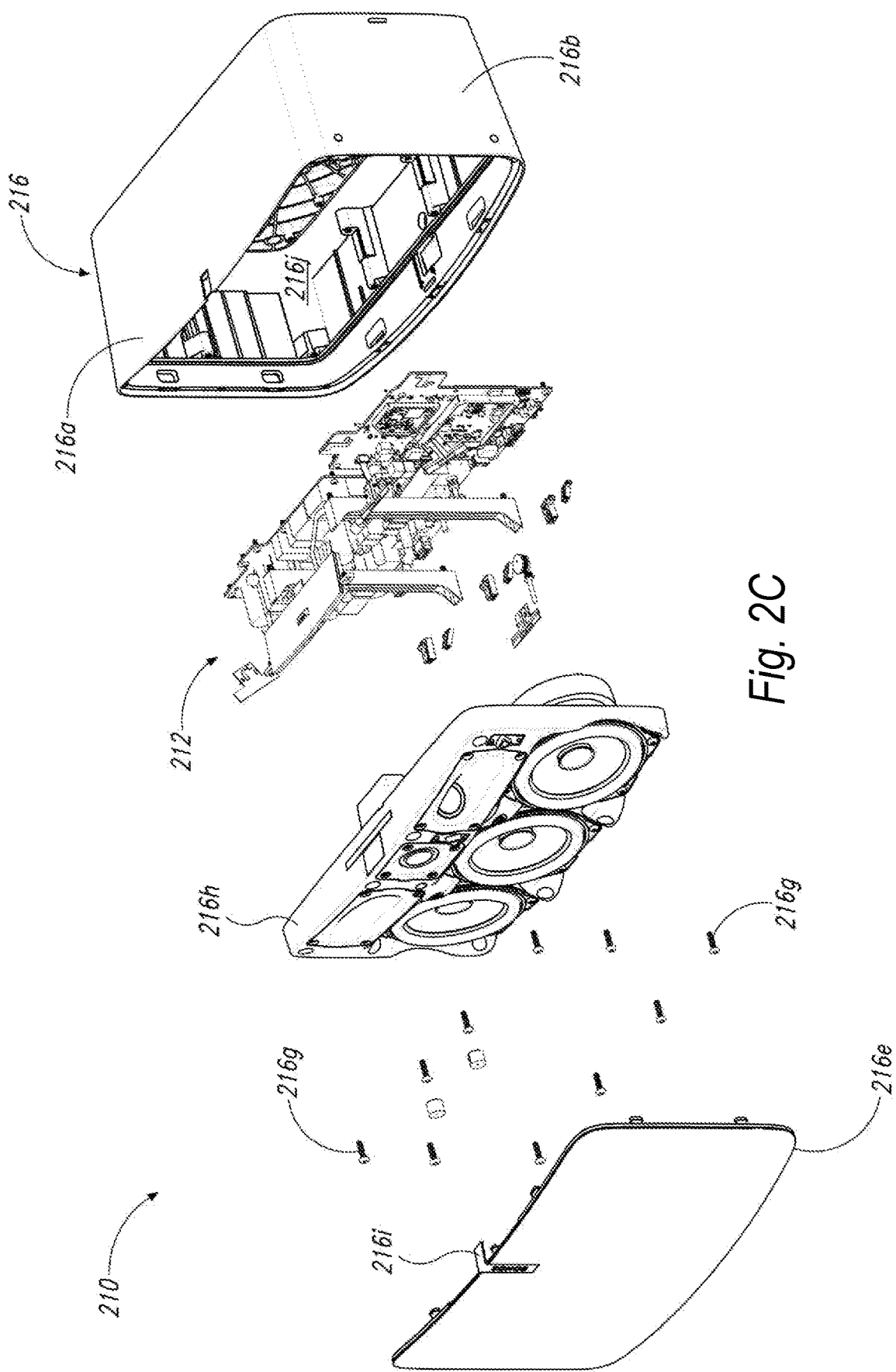
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
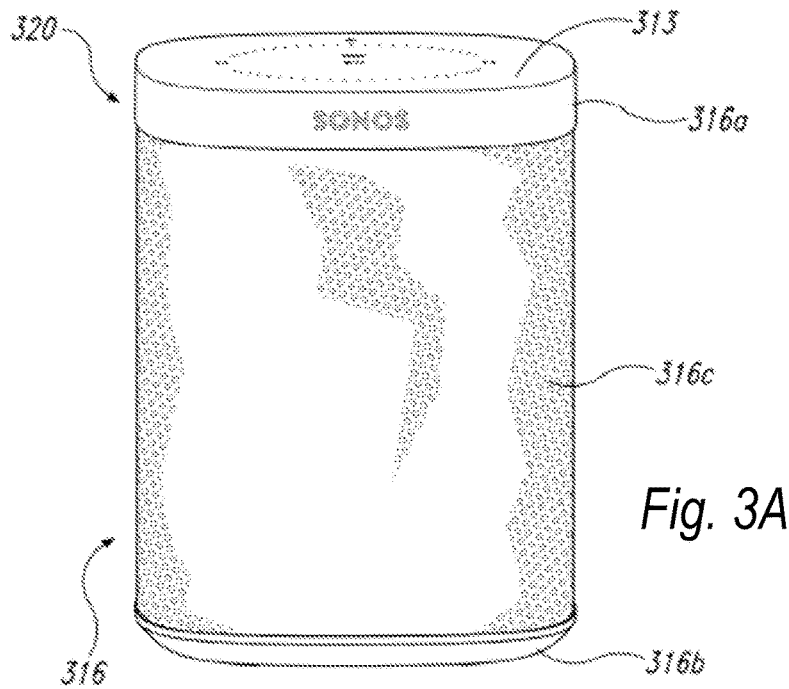
FIG. 3A is a front view of a network microphone device configured in accordance with aspects of the disclosed technology.
Figure 3B:
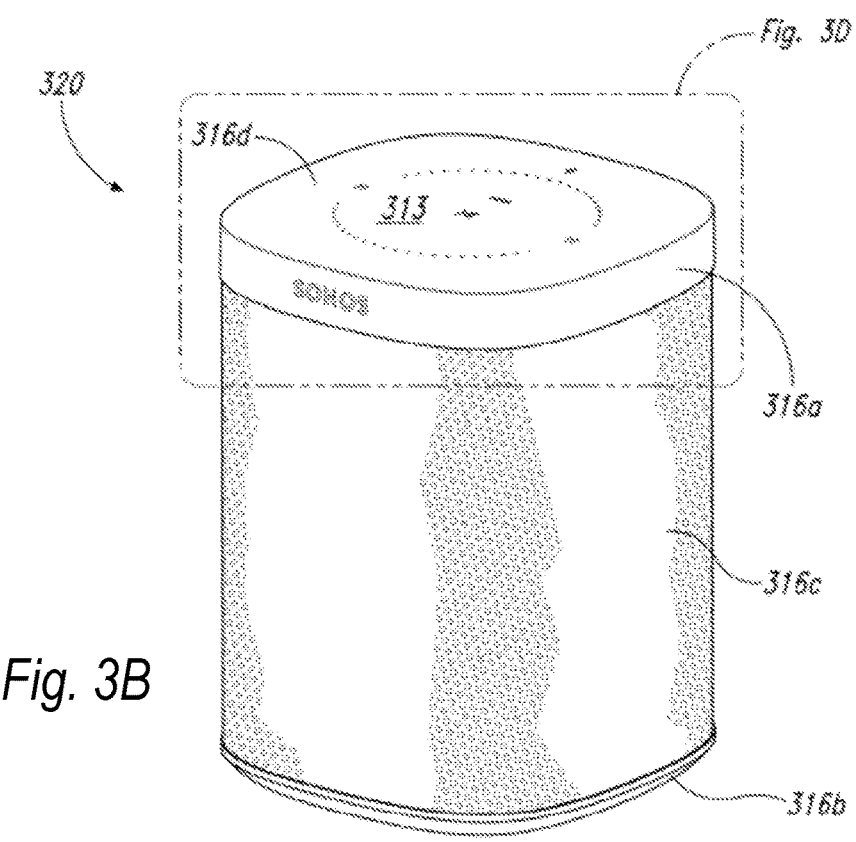
FIG. 3B is a side isometric view of the network microphone device of FIG. 3A.
Figure 3C:
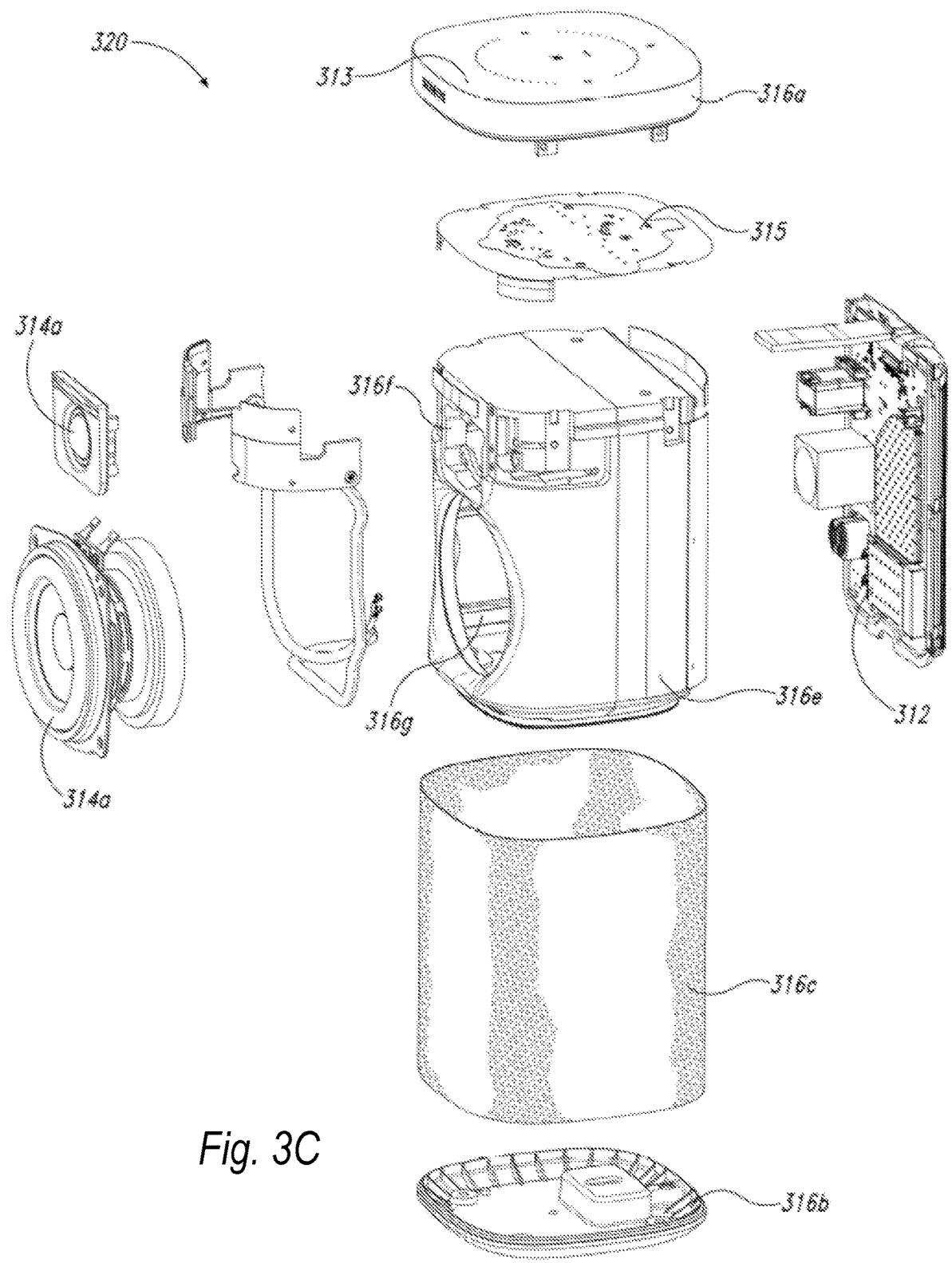
FIG. 3C is an exploded view of the network microphone device of FIGS. 3A and 3B.
Figure 3D:
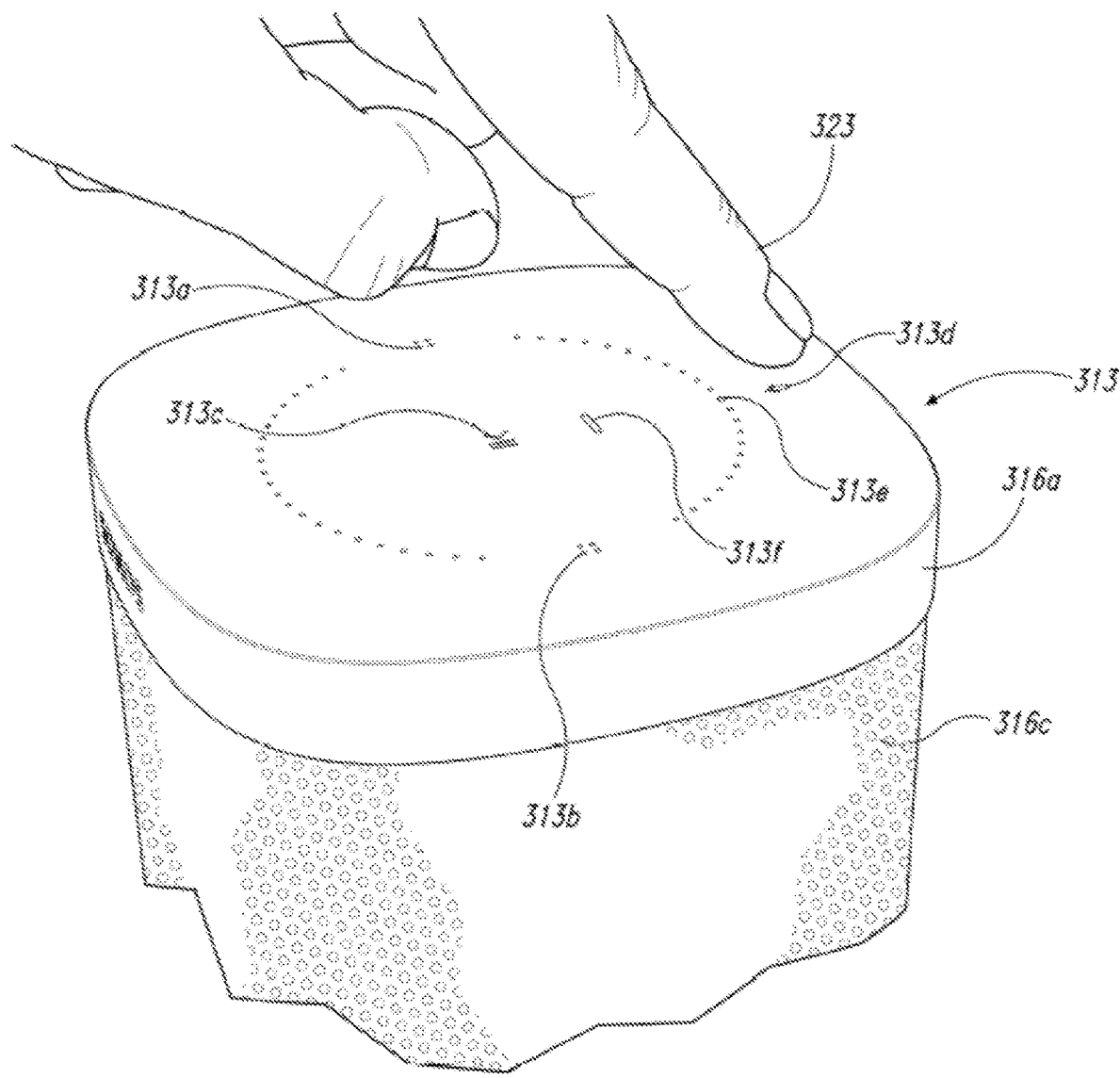
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314*a* and 314*b* altogether.

Electronics 312 (FIG. 3C) includes components configured to drive the transducers 314*a* and 314*b*, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112*a*, the memory 112*b*, the software components 112*c*, the network interface 112*d*, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313*a* (e.g., a previous control), a second control surface 313*b* (e.g., a next control), and a third control surface 313*c* (e.g., a play and/or pause control). A fourth control surface 313*d* is configured to receive touch input corresponding to activation and deactivation of the one or microphones 315. A first indicator 313*e* (e.g., one or more light emitting diodes (LEDs) or another suitable illuminator) can be configured to illuminate only when the one or more microphones 315 are activated. A second indicator 313*f* (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313*e*, omitting the second indicator 313*f*. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
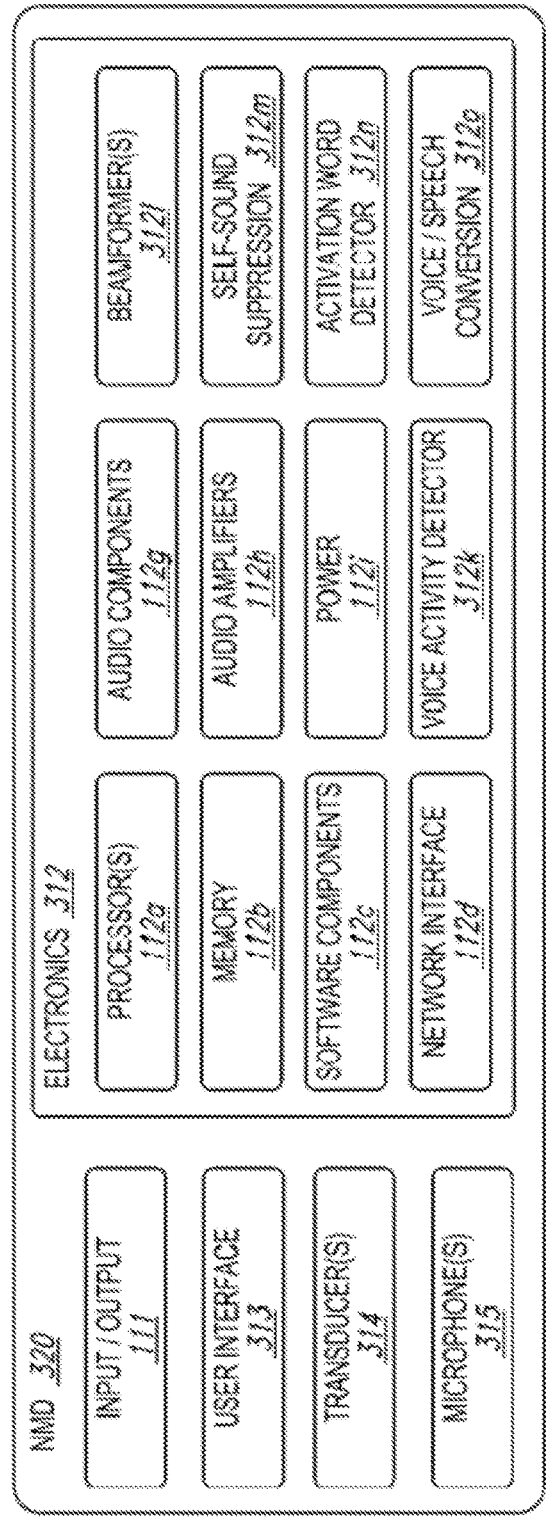
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312*k*, beam former components 312*l*, acoustic echo cancellation (AEC) and/or self-sound suppression components 312*m*, activation word detector components 312*n*, and voice/speech conversion components 312*o* (e.g., voice-to-text and text-to-voice). In the illustrated embodiment of FIG. 3E, the foregoing components 312*k*-312*o* are shown as separate components. In some embodiments, however, one or more of the components 312*k*-312*o* are subcomponents of the processors 112*a*.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
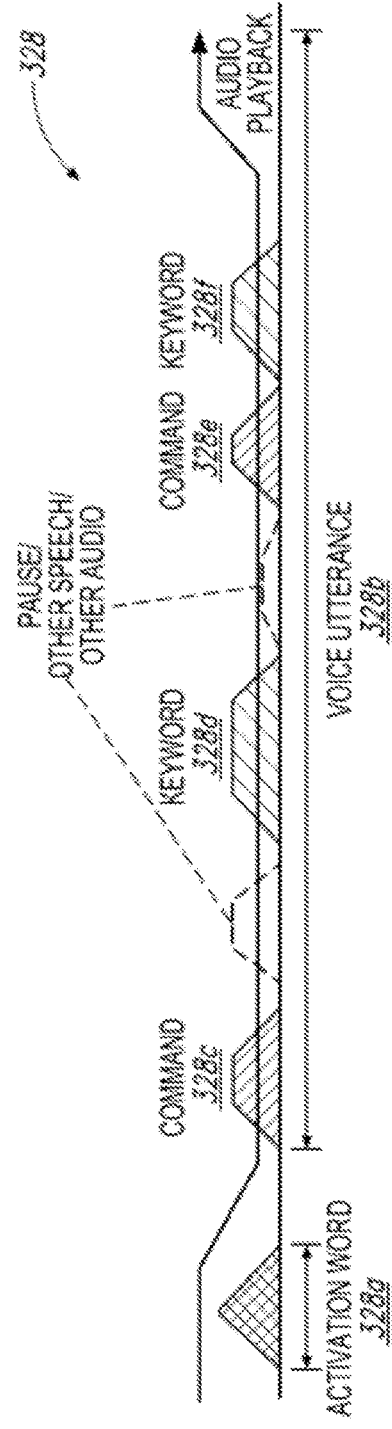
FIG. 3F is a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 3280. In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
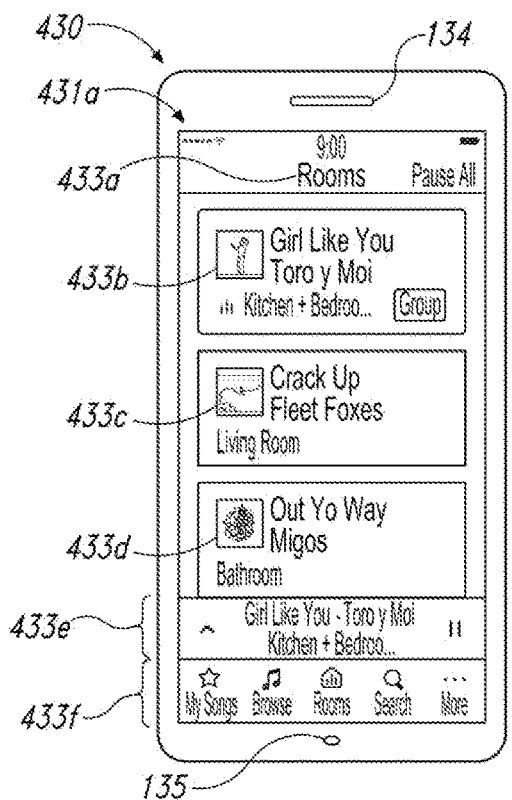
FIGS. 4A, 4B, 4C, and 4D are schematic diagrams of a control device in various stages of operation in accordance with aspects of the disclosed technology.
Figure 4B:
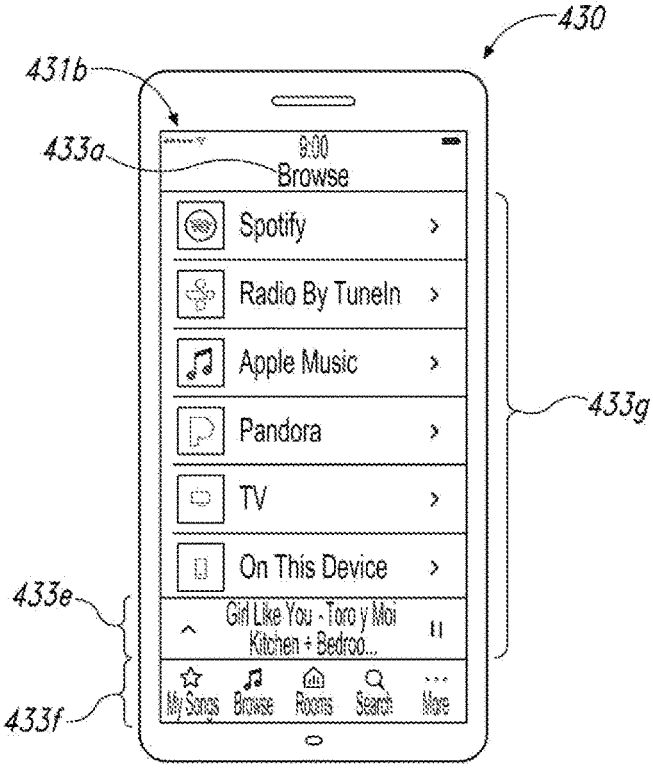
Figure 4C:
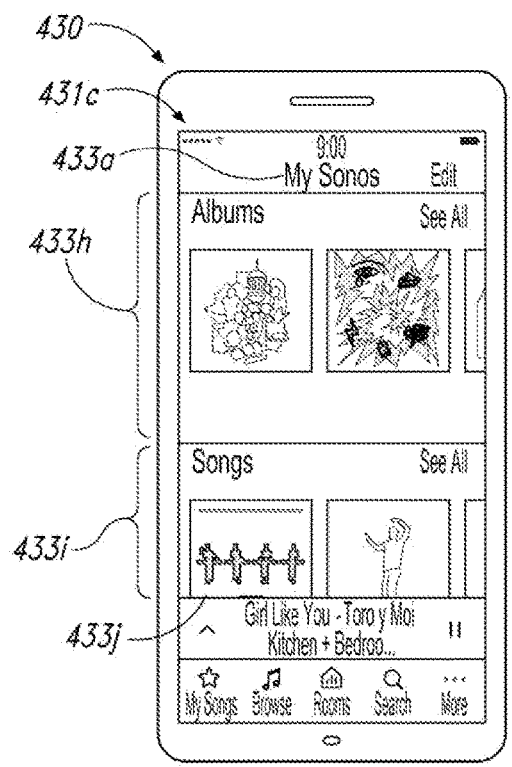
Figure 4D:
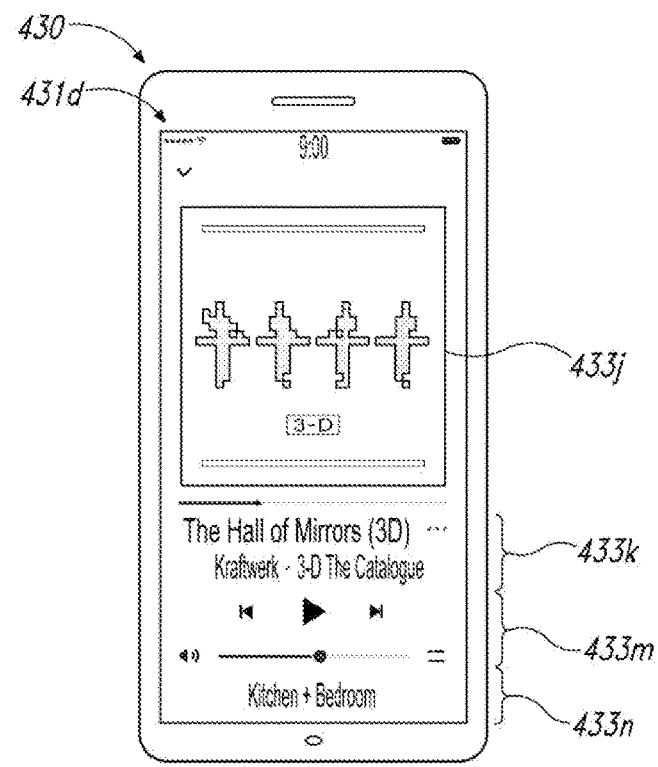

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
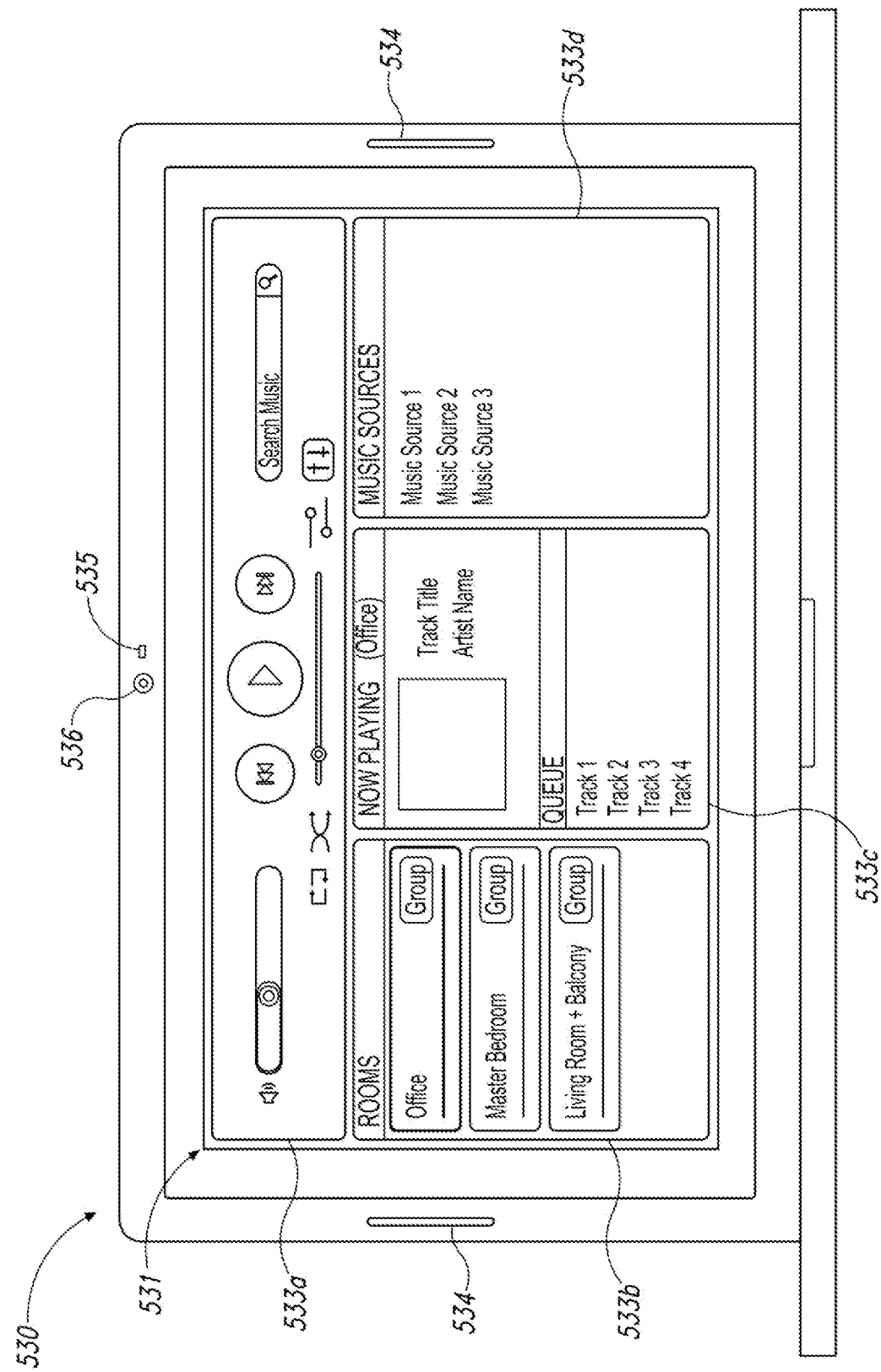
FIG. 5 is a front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, cross-fade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
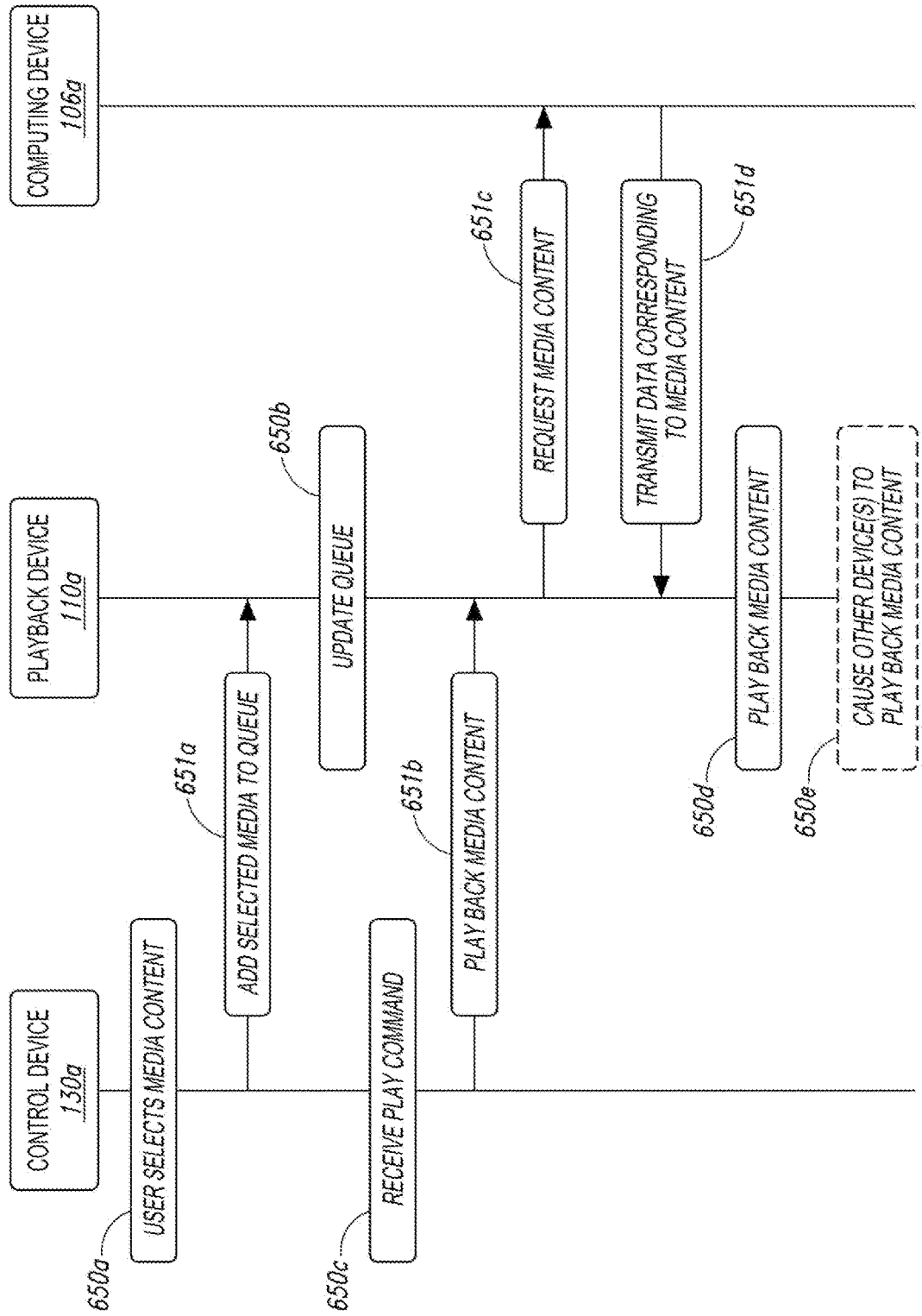
FIG. 6 is a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650*c*, the control device 130*a* receives input corresponding to a command to play back the selected media content. In response to receiving the input corresponding to the command to play back the selected media content, the control device 130*a* transmits a message 651*b* to the playback device 110*a* causing the playback device 110*a* to play back the selected media content. In response to receiving the message 651*b*, the playback device 110*a* transmits a message 651*c* to the computing device 106*a* requesting the selected media content. The computing device 106*a*, in response to receiving the message 651*c*, transmits a message 651*d* comprising data (e.g., audio data, video data, a URL, a URI) corresponding to the requested media content.

At step 650*d*, the playback device 110*a* receives the message 651*d* with the data corresponding to the requested media content and plays back the associated media content.

At step 650*e*, the playback device 110*a* optionally causes one or more other devices to play back the selected media content. In one example, the playback device 110*a* is one of a bonded zone of two or more players (FIG. 1M). The playback device 110*a* can receive the selected media content and transmit all or a portion of the media content to other devices in the bonded zone. In another example, the playback device 110*a* is a coordinator of a group and is configured to transmit and receive timing information from one or more other devices in the group. The other one or more devices in the group can receive the selected media content from the computing device 106*a*, and begin playback of the selected media content in response to a message from the playback device 110*a* such that all of the devices in the group play back the selected media content in synchrony.

III. Example Networking in a Media Playback System

Figure 7:
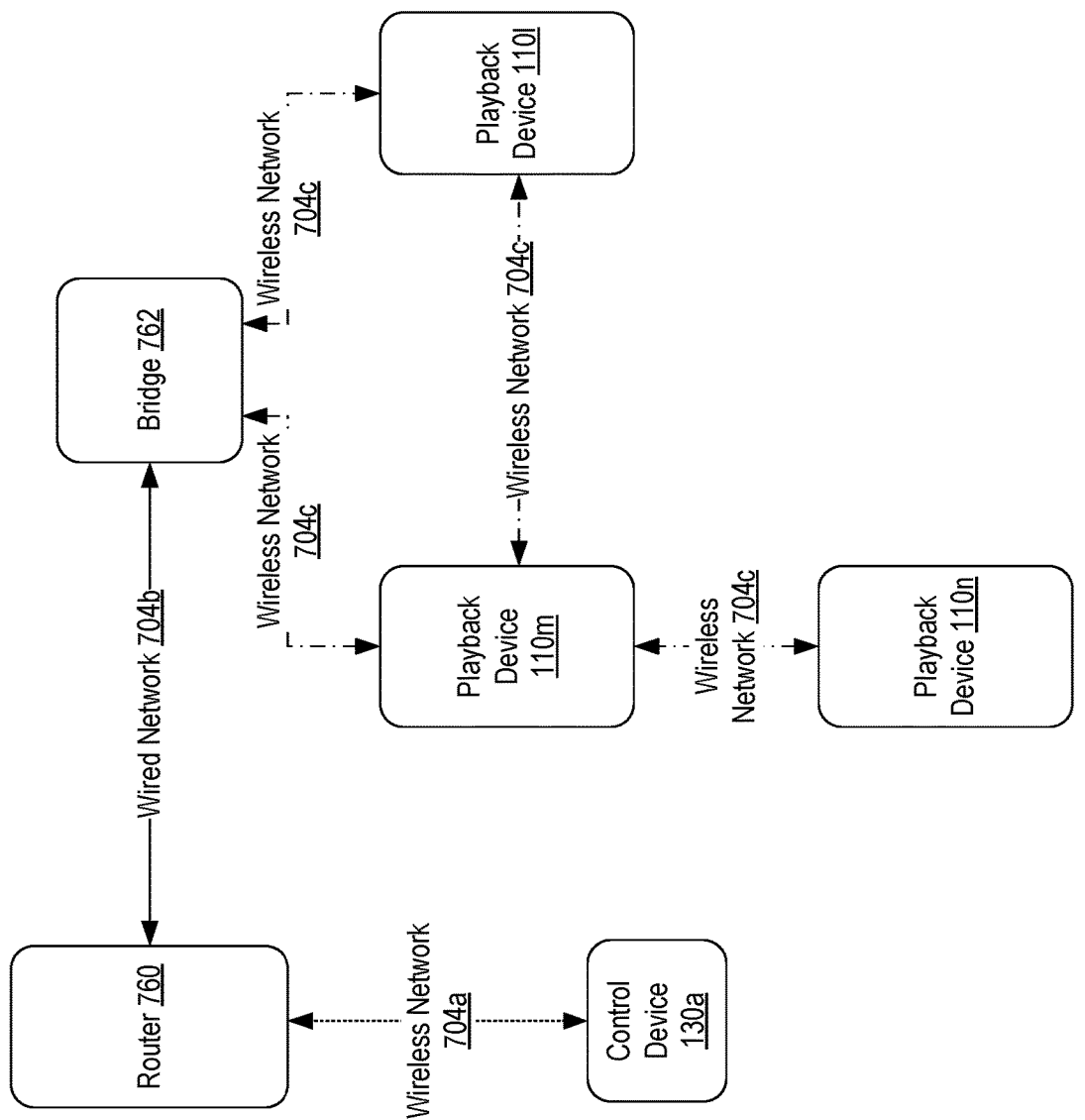
FIG. 7 is a block diagram of an example network mode in accordance with aspects of the disclosed technology.

FIG. 7 is a block diagram illustrating example networks 704 as may be formed by a router 760 and a bridge 762, as well as an example subset of the playback devices 110 in the media playback system 100 (FIG. 1A). The networks 704 may be an example of the network 104 (FIG. 1B). The networks 704 are intended to be representative of a wide variety of networks, which may be formed using the example devices.

In this example, the router 760 is shown as a single block, and is implemented as a router with an integrated wireless access point and an integrated network switch. The access point may include one or more wireless radios, which may provide one or more wireless networks in one or more bands (e.g., the 2.4 GHz and 5 GHz bands). By way of example, these wireless networks include a wireless network 704a.

Within examples, the router 760 may be configured to provide two or more wireless networks. The two or more wireless networks may include at least a first wireless network with a first service set including a first channel and a second wireless network with a second service set including a second channel. The first channel and the second channel may be on different bands. In some cases, the first and second service sets may be configured as an extended service set. Other configurations of multiple wireless networks are possible as well.

In some other examples, the router 760 may be implemented using multiple components. For instance, the router 760 may be implemented using a router component and one or more access points connected to the router component using a wired or wireless backhaul. Other examples are possible as well.

Some implementations of the router 760 may implement a client steering algorithm. Such an algorithm may steer wireless clients between two or more wireless networks on different bands or channels. The steering algorithm may steer clients to a different access point or a different band or channel that improves the connectivity of that client to an access point, which may improve the performance of that client. Additionally or alternatively, the steering algorithm may attempt to improve the performance of the network as a whole by balancing the load (i.e., the clients) among the available access points, bands, and channels.

By way of example, as shown in FIG. 7, the router 760 is connected to two devices. In particular, the control device 130a (FIG. 1A) is connected to the router 760 via the wireless network 704a. A bridge 762 is connected via a wired network 704b to the router 760.

The bridge 762 is a type of access point that forms the root of a mesh network 704c. In this example, the mesh network 704c is formed according to spanning tree protocol. As shown, the bridge 762 connects directly to the playback device 110m and 110l. The playback device 110n is connected to the playback device 110m. The mesh network may take the form of a proprietary mesh network known as SonosNet, which is configured to facilitate operations of the media playback system 100 (FIG. 1A). In some examples, a playback device (e.g., a playback device that is connected via a wired Ethernet connection) may form the root of such a mesh network.

The playback devices 100m and 110l are bonded into a stereo pair (FIG. 1I) in the master bedroom 101b. In contrast to some implementations of spanning tree protocol, the playback device 100m and playback device 110l form a direct route via the wireless network 704c. Such a direct route may facilitate various operations within the bonded zone. This direct route is possible because the playback device 100m and playback device 110l are on the same wireless network, including the same wireless band and channel. Further example techniques related to direct routes in a media playback system are described in U.S. Pat. No. 9,521,074, filed on May 10, 2012, and titled "Methods and Apparatus for Direct Routing Between Nodes of Networks," which is hereby incorporated by reference in its entirety.

Figure 8:
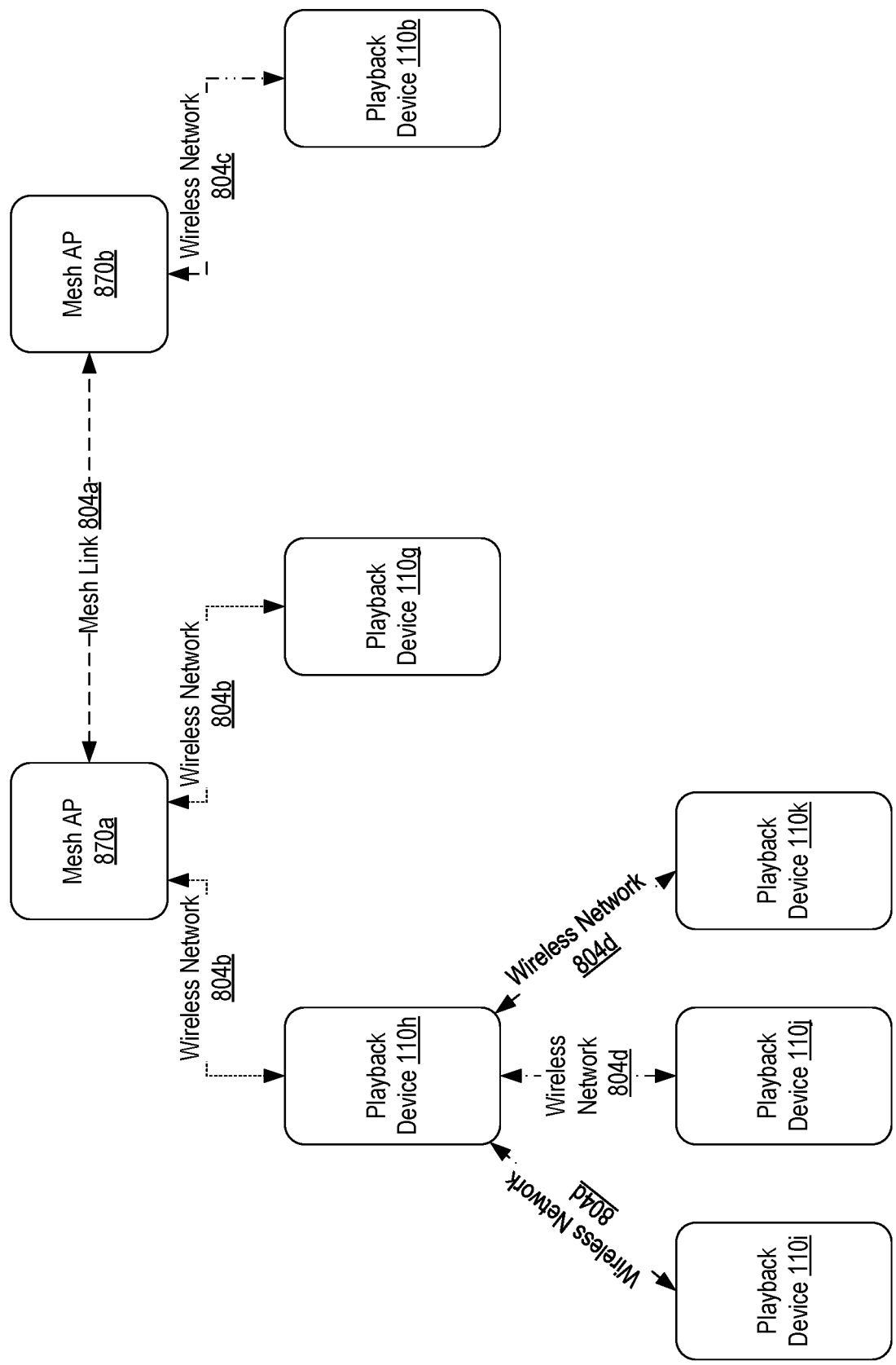
FIG. 8 is a block diagram of another example network mode in accordance with aspects of the disclosed technology.

FIG. 8 is a block diagram illustrating example networks 804 as may be formed by mesh access points 870, as well as an example subset of the playback devices 110 in the media playback system 100 (FIG. 1A). The networks 804 may be an example of the network 104 (FIG. 1B). The networks 804 are intended to be representative of a wide variety of networks, which may be formed using the example devices.

As shown in FIG. 8, a mesh access point 870a is connected to another mesh access point 870b via a mesh link 804a. Such a configuration may allow the mesh access points 870a and 870b to provide a wireless network including 804b and 804c that has a larger overall coverage area, as the mesh access points 870a and 870b may be physically separated to form networks in different locations. In some examples, additional mesh access points may be connected with additional mesh links like mesh link 804a, which may further increase coverage and/or capacity of the network including 804b and 804c.

Continuing with FIG. 8, the playback device 110h, the playback device 110g, and the playback device 110b are connected to the mesh access points 870a and 870b. In particular, the playback device 110h and the playback device 110g are connected to the mesh access point 870a via a wireless network 804b and the playback device 110b is connected to the mesh access point 870b via a wireless network 804c. In this example, the wireless network 804b is operating on a first band (e.g., 2.4 Ghz) while the wireless network 804c is operating on a second band (e.g., 5 Ghz). Other examples are possible as well.

The playback device 110h is configured to function as a home theater coordinator of a surround sound configuration (FIG. 1K) that includes the playback device 110h, the playback device 110j, the playback device 110k and the playback device 110i in the den 101c (FIG. 1A). As a home theater coordinator, the playback device 110h forms a wireless network 804d. In this example, the playback device 110j, the playback device 110k and the playback device 110i form direct connections with the playback device 110h using the wireless network 804d.

Within examples, the access points 870a and 870b may individually, or in coordination, implement a steering algorithm. Such an algorithm may be similar to a steering algorithm implemented by the router 760 (FIG. 7), which may steer clients to a different access point or a different band or channel that improves the connectivity of that individual client to an access point, which may improve the performance of that client. Additionally or alternatively, the steering algorithm may attempt to improve the performance of the network as a whole by balancing the load (i.e., the clients) among the available access points, bands, and channels.

In some cases, such a steering algorithm may interfere with operation of the media playback system 100 (FIG. 1A). In particular, a steering algorithm may steer one or more of the playback devices 110 to different access points, which may increase latency in communications between the playback devices 110 by increasing the number of hops. Yet further, in some cases, the steering algorithm may steer playback devices 110 to wireless networks on different bands or channels, which may inhibit some functionality, such as the forming of direct routes between two playback devices 110.

Figure 9A:
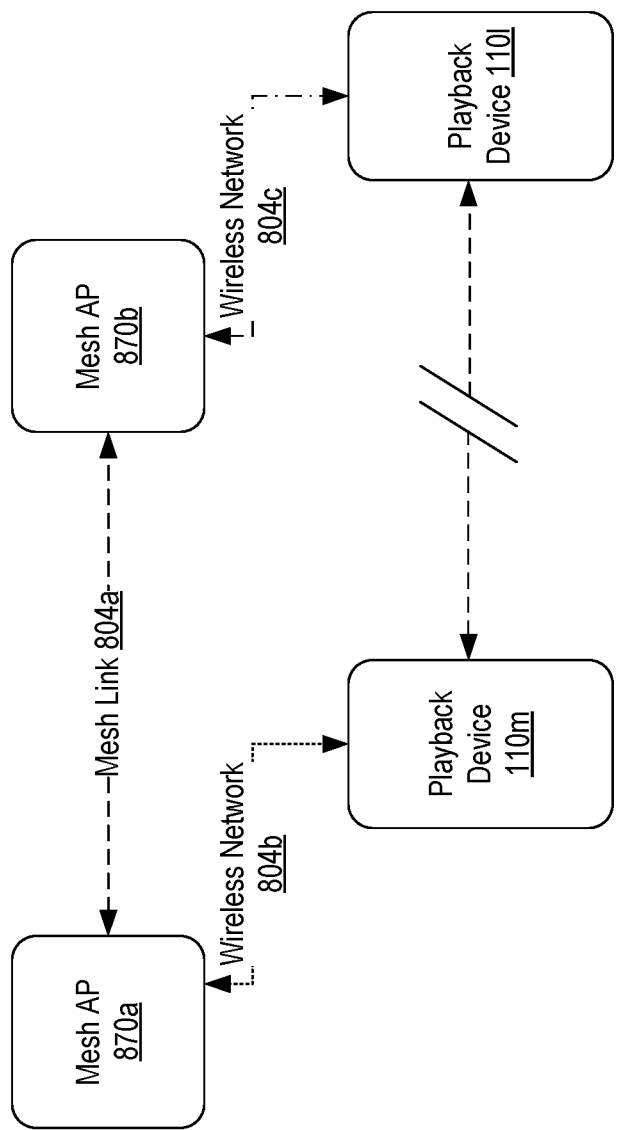
FIG. 9A is a block diagram illustrating an example network topography in a media playback system in accordance with aspects of the disclosed technology.

To illustrate, FIG. 9A illustrates an example where the playback device 110m and the playback device 110l are directed by a steering algorithm to different wireless access points. In particular, the playback device 110m is connected to the mesh access point 870a via the wireless network 804b and the playback device 110l is connected to the mesh access point 870b via a wireless network 804c. As described above in connection with FIG. 8, the wireless network 804b and the wireless network 804c are operating in different bands, which prevents the playback device 110*m* and the playback device 110*l* from forming a direct connection.

Example wireless access points described herein may prevent such steering from interfering with operation of the media playback system. An example wireless access point may be configured to cause certain playback devices 110 to connect to the same access point, band, and channel (referred to collectively as the same wireless network). For example, bonded and/or grouped playback devices (FIGS. 1I-1L) may be connected to the same wireless network.

Figure 9B:
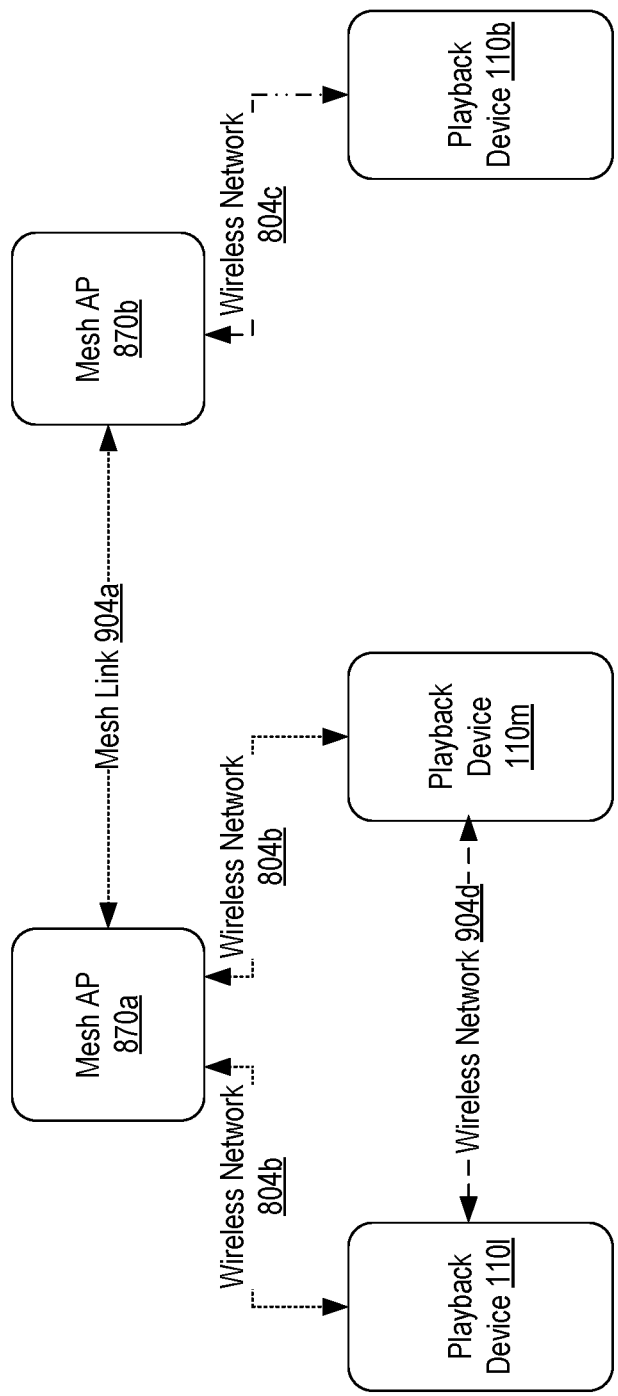
FIG. 9B is a block diagram illustrating an example network topography in a media playback system in accordance with aspects of the disclosed technology.

To illustrate, the wireless access points 870*a* and 870*b* may cause the playback device 110*m* and the playback device 110*l*, as a stereo pair (FIG. 1I), to connect to the same wireless network. FIG. 9B illustrates an example where the playback device 110*m* and the playback device 110*l* are each connected to the mesh access point 870*a* via the wireless network 804*b*. This configuration allows the playback device 110*m* and the playback device 110*l* to form a direct connection via the wireless network 904*d*. Other clients are free to connect to the mesh access point 870*b* via the wireless network 804*c*, as illustrated by the playback device 110*b*.

Within examples, the media playback system 100 may send data representing the groupings to the access points 870*a* and 870*b*. For instance, after connecting to access point 870*a*, one or both of the playback device 110*m* or the playback device 110*l* may send data representing a group identification to the access points 870*a* and 870*b*. The access point 870*a* and 870*b* may then steer playback devices 110*m* and 110*l* (having the same group identification) to the same access point, which in this case is access point 870*a*. Different groups within the media playback system 100 may have different group identifications, as these groups may, in some examples, be steered to different access points, bands, or channels as other groups.

In other examples, the data representing the groupings may take the form of a request to connect a playback device to the same access point as one or more other playback devices 110. For instance, the playback device 110*m* may identify the playback device 110*l* using an identifier (e.g., a MAC address) and request to join the same wireless network as the playback device 110*l*. The access points 870 may be configured to receive and respond to such a request by connecting the playback device 110*m* to the same wireless network as the identified playback device 110*l*, based on the request by the playback device 110*m*.

Yet further, in operation, after connecting bonded and/or grouped playback devices 110 to the same wireless network, the access points 870*a* and 870*b* may prevent a steering algorithm from separating the bonded and/or grouped playback devices 110*l* and 110*m*. In some examples, the access points 870*a* and 870*b* may disable or exempt playback devices 110*l* and 110*m*, which form a bonded playback devices and/or are in a group from being eligible for steering by a steering algorithm. For instance, the access points 870*a* and 870*b* may maintain a list or other data structure representing the bonded and/or grouped playback devices 110*l* and 110*m* in the media playback system 100, to which the access points 870 may refer to prevent steering of these devices. In such an example, the playback devices 110*l* and 110*m* may maintain connection to the same wireless network as they are not subject to steering.

In some implementations, the access points 870*a* and 870*b* may, when appropriate, steer bonded and/or grouped playback devices 110*l* and 110*m* to the same access point. That is, the bonded and/or grouped playback devices 110*l* and 110*m* are subject to steering, but any steering applies to each of the bonded and/or grouped playback devices 110*l* and 110*m*. The access points 870*a* and 870*b* may maintain or have access to (e.g., from the media playback system 100) data representing the bondings and/or groupings present in the media playback system 100. When the steering algorithm determines to steer a playback device, the access points 870*a* and 870*b* may refer to such data and determine whether the pertinent playback device is part of a bonded playback device and/or is in a group.

Figure 9C:
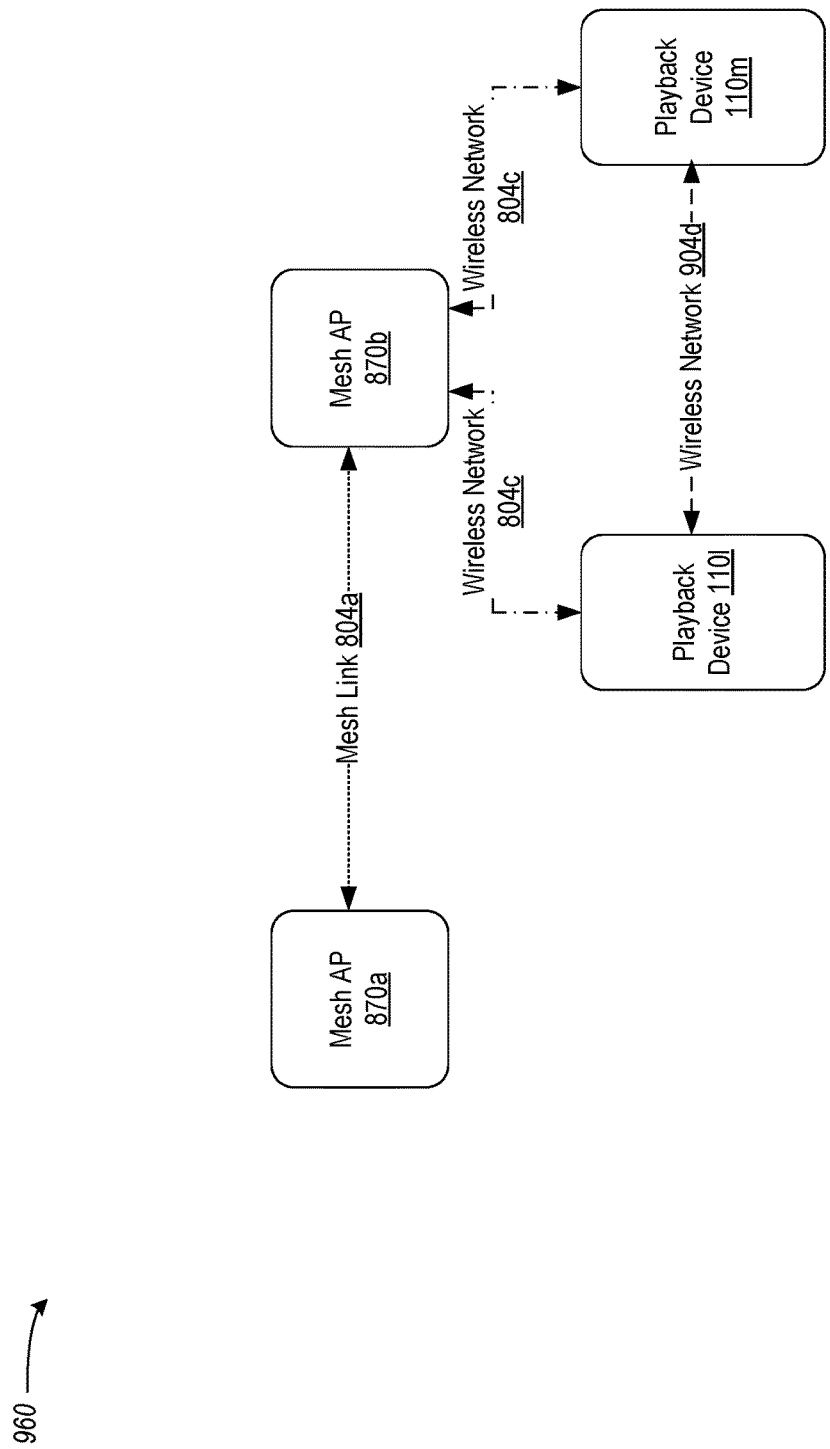
FIG. 9C is a block diagram illustrating an example network topography in a media playback system in accordance with aspects of the disclosed technology.

For instance, in operation, a steering algorithm may determine to steer the playback device 110*m* from the wireless network 804*b* to the wireless network 804*c*. The access points 870*a* and 870*b* may determine that the playback device 110*m* is bonded with the playback device 110*l* (i.e., a stereo pair) and then, when appropriate, steer both of the playback device 110*m* and the playback device 110*l*. FIG. 9C illustrates an example where the playback device 110*m* and the playback device 110*l* have been steered from connection to the wireless network 804*b* to connection to the wireless network 804*c*.

As discussed, the parameters applied to the steering algorithms include steering two or more playback devices together, instead of individually. The two or more playback devices may be bonded playback devices or grouped playback devices. In one example, bonded playback devices are always steered together, regardless of whether the playback devices are playing back audio content, while grouped playback devices are steered together if they are actively playing back audio content in synchrony, but may be steered separately if they are not actively playing audio content in synchrony. In another example, playback devices that are frequently grouped together based on historical usage data may be steered together, even when they are not currently grouped together. Other examples are also possible.

While the wireless access points 870*a* and 870*b* are described by way of example, these example features may be performed by other devices, such as the router 760. Yet further, the example features may be performed by a single device or multiple devices operating in coordination. In one case, the parameters representing bonded playback devices and/or groups (e.g. group identifications) for the steering algorithm executed by the access points and/or routers may be provided by the media playback system, via a playback device or the controller, upon formation of bonded playback devices and/or groups. The access points and/or routers may then apply those parameters when executing the steering algorithms. In another case, bonded and/or grouped playback devices may follow one another to a different access point when one (or a majority) of the bonded and/or grouped playback devices has been steered to a different access point. In this case, the access points may be configured to accommodate the request of the non-steered playback device(s) to follow the steered playback device(s). Other examples are possible as well.

Within examples, an access point may proxy for one or more playback devices that are in a first mode, such as a low-power (or "sleep") mode. An access point operating as a proxy for a playback device may be referred to as a sleep proxy. Example techniques related to a proxy in a media playback system are described in U.S. Pat. No. 10,871,815, filed on Sep. 28, 2018, and titled "Network Identification of Portable Electronic Devices While Changing Power States," which is hereby incorporated by reference in its entirety.

Figure 10A:
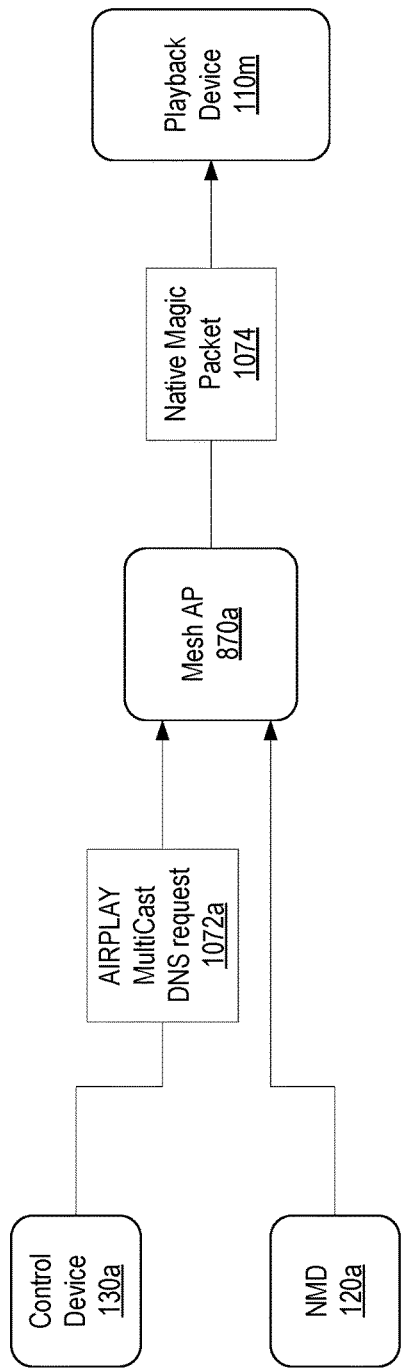
FIG. 10A is a block diagram illustrating an example network proxy in accordance with aspects of the disclosed technology.

FIG. 10A is a block diagram illustrating the mesh access point 870*a* operating as a sleep proxy for the playback device 110*m*. In a low-power or sleep mode, the playback device 110*m* may disable one or more components or otherwise place such components in a sleep or suspend/inactive state, which may reduce power consumption by the playback device 110*m*. For instance, the playback device 110*m* may put a system-on-a-chip including the primary processors into a suspend mode. Further example techniques related to such modes in a media playback system are described in U.S. Pat. No. 9,244,516, filed on Sep. 30, 2013, and titled "Media Playback System Using Standby Mode in a Mesh Network," which is hereby incorporated by reference in its entirety.

As a sleep proxy for the playback device 110*m*, the access point 870*a* may listen for queries supported by the playback device 110*m*. In some cases, these queries may take the form of magic packets that are specially formed to wake up devices that support a given protocol. As another example, these queries may take the form of a request (e.g., a Multicast DNS query) for compatible devices to respond to indicate their availability. An example of this is the Bonjour® Sleep Proxy.

When the access point 870*a* detects one of the supported queries, the access point 870*a* may send a particular type of packet (e.g. a native magic packet) to the playback device 110*m*. The playback device 110*m* monitors for this particular type of packet and wakes up from the low-power mode based on receipt of one of these packets.

Within examples, the mesh access point 870*a* may begin operating as a sleep proxy for the playback device 110*m* (and/or other playback devices) based on receiving a request to proxy from the playback device 110*m*. The playback device 110*m* may send the request for the mesh access point 870*a* to act as a sleep proxy as part of the process of the playback device 110*m* entering the sleep state (i.e. low-power mode, inactive state, etc.) In some cases, the request may include or be accompanied by data representing one or more protocols supported by the playback device 110*m*. The mesh access point 870*a* may then monitor for packets corresponding to these protocols.

Some example playback devices 110 may support control using more than one protocol. For instance, a playback device 110 may be controlled natively by a control device 130*a* (e.g., using a media playback system app on a smartphone or other network device). The playback device may also be controlled using various other streaming/control protocols, such as AIRPLAY®, SPOTIFY CONNECT®, GOOGLE CAST®, or PANDORA®, using various applications or software implementing such protocols. Some users may utilize multiple control schemes on a single control device 130*a* while other users may utilize different streaming/control protocols on different devices.

These streaming/control protocols may have different queries that wake up devices supporting the respective protocol. Within examples, when using a given protocol, opening or interacting with a menu with controls selectable to select a target device for playback or another operation may trigger transmission of a query (e.g., a magic packet and/or request) according to that protocol. This query may be sent to identify devices on the network that are available for control. In other examples, selection of a selectable control corresponding to a particular target device may transmit a query according to that protocol. Other triggers for sending a query are possible as well. For instance, a network microphone device, such as the NMD 120*a*, may send a query based on detecting a voice input or based on receiving a response to a voice input that targets a particular device.

For instance, as illustrated in FIG. 10A, using the AIRPLAY® menu on the control device 130*a* may trigger transmission of an AIRPLAY® multicast DNS (mDNS) request 1072*a*. The mesh access point 870*a* receives the transmission and detects that the received transmission includes data representing the AIRPLAY® mDNS request 1072*a*. In some cases, the mesh access point 870*a* determines whether the data representing the AIRPLAY® mDNS request 1072*a* corresponds to one of the protocols supported by the playback device 110*m*.

Within examples, the AIRPLAY® mDNS request 1072*a* may conform to a protocol, such as the Bonjour® sleep proxy. According to that protocol, a device may send an mDNS query to request DNS resolution of available devices. Such a mDNS message may be sent using a particular address (e.g., IPv4 address 224.0.0.251 or IPv6 address ff02::fb), port (e.g., UDP port 5353), and payload (e.g., a header and data). As a device supporting this protocol, the mesh access point 870*a* may be configured to listen for such queries.

Based on such detection and/or determinations, the mesh access point 870*a* sends a magic packet to wake up the playback device 110*m*. In the FIG. 10A example, the mesh access point 870*a* sends a native magic packet 1074, which is a different type of magic packet as the AIRPLAY® multicast DNS request 1072*a*. In this example, the native magic packet 1074 is a specially-formed magic packet that the playback devices 110 of the media playback system 100 are configured to recognize. Based on receipt of this native magic packet 1074, the playback device 110*m* wakes up from the low-power mode and switches to another mode (e.g., a second mode where the components that were placed into a low-power or suspend state in the first mode are no longer in such a state, e.g. full-power mode).

In some examples, a mesh access point may also send a response on behalf of the proxied playback device to the device sending the request. For instance, the mesh access point 870*a* may send, to the control device 130*a*, a response to the AIRPLAY® multicast DNS request 1072*a*. Such a response may indicate the availability of the playback device 110*m* to the control device 130*a*, as well as other information, such as its network address.

Within examples, one or more of the playback devices 110 may be configured to monitor communications for only one or more particular types of transmissions, such the native magic packet 1074, rather than all queries and/or magic packets corresponding to protocols supported by the playback device 110*m*. In other examples, one or more of the playback devices 110 may be configured to monitor for the native magic packet 1074 and one or more queries for respective protocols, albeit perhaps not every query for each protocol supported by the playback devices 110. In yet further examples, the playback devices 110 may be configured to monitor for all supported queries and magic packets.

In some examples, configuring the playback devices 110 to monitor for a limited number of queries may allow for such monitoring to be performed using fewer resources or components. Practically, monitoring for all supported queries may require one or more relatively powerful (e.g., main) processors to be active in processing received wireless transmissions. However, if the monitoring is limited to a particular subset of transmissions (e.g., the native magic packet 1074), such monitoring may be performed using fewer resources or components (e.g., the network interface and its integrated processors). This may allow more powerful (and power hungry) processors to be disabled or placed into a sleep mode while in the first mode. Yet, at the same time, since the sleep proxy (e.g., the mesh access point 870*a*) is configured to send one of the particular subset of transmissions based on detecting one of the supported packets, any of the supported queries will cause the sleep proxy to wake up the playback devices 110.

In some implementations, based on detecting a supported query, the sleep proxy may determine whether the supported query is intended for one of the playback devices 110 for which the sleep proxy is proxying for. For instance, based on detecting the AIRPLAY® multicast DNS request 1072*a*, the mesh access point 870*a* may determine that the AIRPLAY® multicast DNS request 1072*a* is intended to control the playback device 110*m* (which the mesh access point 870*a* is proxying for). Based on this determination, the mesh access point 870*a* may send the native magic packet 1074 to wake up the playback device 110*m*.

Figure 10B:
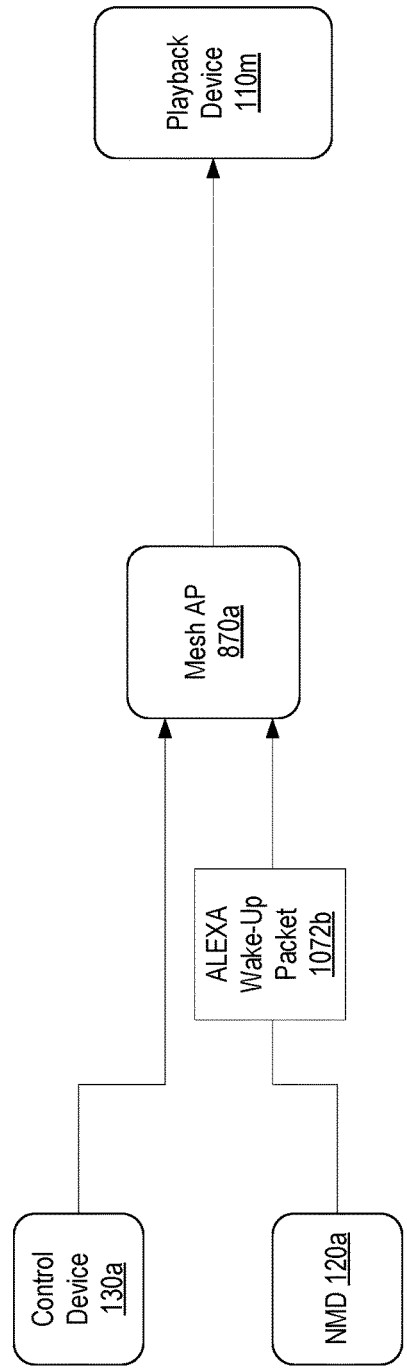
FIG. 10B is a block diagram illustrating an example network proxy in accordance with aspects of the disclosed technology.

Conversely, in some cases, the sleep proxy may determine that a detected query is not intended for the playback device 110*m* for which the sleep proxy is proxying for. In such a case, the sleep proxy may forgo sending a magic packet (e.g., the native magic packet 1074), thereby preventing an unnecessary wake-up of the playback device 110*m*. For instance, as illustrated in FIG. 10B, detecting a voice input may trigger transmission of a ALEXA® magic packet 1072*b*. The mesh access point 870*a* receives the transmission and detects that the received transmission includes data representing the ALEXA® magic packet 1072*b*. However, in this case, the mesh access point 870*a* determines that the NMD 120*b* is not intending to control the playback device 110*m* and, based on this determination, forgoes sending a magic packet (e.g., the native magic packet 1074) to wake-up the playback device 110*m*.

The sleep proxy may use any suitable technique to determine whether a control device 130 or NMD 120 is intending to control a proxied playback device(s) 110. Some protocols may transmit data indicative of a targeted device after or in conjunction with a query, perhaps in a HTTP header or in another part of a data transmission. The access point may monitor these transmissions and determine whether the playback device that is being proxied for is the intended target. In another example, the device sending the query may specifically indicate the target device(s) in the query. Other examples are possible as well.

As noted above, in some cases, an access point may be a sleep proxy for multiple playback devices. In such examples, based on receiving a query that two or more of the playback devices support, the access point may send a magic packet to wake up each of the two or more playback devices. For instance, the mesh access point 870*a* may send a native magic packet 1074 to the playback device 110*m* and another playback device. Alternatively, as discussed above, the access point may determine whether the query is intended to target a particular device or set of devices, and based on the determination send a magic packet or packets to wake up only the particular device or set of devices.

Where multiple access points are present in a network, two or more of the access points may proxy for different playback devices. Within examples, the playback device 110*m* may request a particular access point (e.g., the access point to which it is connected) to proxy for the playback device 110*m*. In other examples, one or more particular access points may operate as a sleep proxy for the playback device 110*m* on the network 104. Other configurations are possible as well.

After the mesh access point 870*a* wakes up the proxied playback device 110*m*, the mesh access point 870*a* may update its configuration to no longer proxy for the playback device 110*m*. Yet further, the playback device 110*m* may start monitoring for communications on its own, rather than via a sleep proxy. At a later time, the playback device 110*m* may request the access point (or another device) to operate as a sleep proxy for the playback device 110*m* before entering the low-power mode.

Portable (battery-powered) playback devices (such as the Sonos Move®) are one example of a playback device that may enter into a low-power mode and may benefit from a sleep proxy server. That is, by offloading the processing involved in monitoring for queries and/or avoid unnecessary wake-ups, a battery-powered playback device may avoid power consumption and thereby extend battery life. Nonetheless, wall-powered playback devices may benefit from decreased power consumption and other benefits as well.

In one example, the access point 870*a*, acting as a sleep proxy for the playback device 110*m* while the playback device 110*m* is in a sleep mode (i.e. low-power mode), may also be configured to respond to queries from e.g. the control device 130, without necessarily transmitting the native magic packet 1074 to the playback device 110*m*. For instance, initiation of a SPOTIFY CONNECT® session on the control device 130 may cause the control device 130 to transmit a query to identify playback devices available on the network to be controlled via SPOTIFY CONNECT®. In response, the access point 870*a*, based on data indicating that playback device 110*m* is available for SPOTIFY CONNECT® when it requested access point 870*a* to be a sleep proxy, may indicate to control device 130 that the playback device 110*m* is available to be controlled via SPOTIFY CONNECT®, without sending the native packet 1074 to wake playback device 110*m*.

The control device 130 may accordingly display on the SPOTIFY CONNECT® interface that playback device 110*m* is available to be controlled. In the event playback device 110*m* is selected to be controlled via SPOTIFY CONNECT®, the access point 870*a* may then send the native magic packet 1074 to wake the playback device 110*m* such that the control device 130 and the playback device 110*m* may be connected for a SPOTIFY CONNECT® playback session. Otherwise, if a different playback device or no playback device is selected, the access point 870*a* will not send the native magic packet 1074 to playback device 110*m* and the playback device 110*m* will remain in the sleep mode. Such an implementation may further prevent unnecessary wake-ups when the control device 130 is merely querying for available devices. Other examples are also possible.

In some cases, the playback device 110*m* may determine to go to sleep but be unable to find a device capable of operating as a sleep proxy. In such cases, the playback device 110*m* may enter a modified low-power mode in which the playback device 110*m* monitors for additional queries (e.g., for queries of one or more additional supported protocols relative to the unmodified sleep mode). Alternatively, the playback device 110*m* might not enter a modified sleep mode, and as such may only be wakeable using a subset of magic packets supported by the playback device 110*m*.

While operating as a sleep proxy for the playback device 110*m*, the access point 870*a* may determine that it is no longer able to operate as the sleep proxy for the playback device 110*m*. In such cases, the access point 870*a* may send a magic packet to wake the playback device 110*m*. Sending such a packet may prevent the playback device 110*m* from becoming "lost" (i.e., unreachable) by certain devices when the access point 870*a* is no longer operating as a sleep proxy for the playback device 110*m*.

As noted previously, while the examples above generally reference an access point as the sleep proxy for a playback device when the playback device enters a sleep mode, one having ordinary skill in the art will appreciate that other types of network-capable devices may act as a sleep proxy for the playback device. For instance, a battery-powered playback device may request another playback device that is connected to power (e.g. plugged into a wall outlet) to sleep proxy for the battery-powered playback device before entering the sleep mode. This may allow the battery-powered playback device in order to conserve battery power.

Some examples may involve a fixture configured to receive a bulb. FIG. 11A illustrates an example fixture 1180. The fixture 1180 includes a connector 1182, which is configured to receive a bulb. Various types of bulbs may be connected to the fixture 1180 via the connector 1182.

One example bulb is a sound bulb 1110, as shown. The sound bulb may include an audio transducer 1196 (e.g., a speaker) and a connector 1194, which is configured to connect to the fixture 1180 via the connector 1180. In addition to these features, the sound bulb 1110 may have similar components and features as the playback devices 110 described herein, but be configured in a bulb form factor to be received in the fixture 1180, as shown in FIG. 11B.

The fixture may include a Power-over-Ethernet (PoE) port 1182 to receive data and power from a PoE switch. When a bulb, such as the sound bulb 1110, is received in the fixture 1180, a connection forms that passes data and power from the PoE switch to the bulb. The sound bulb 1110 may power itself using this connection and also utilize the data connection to form a network connection to the network 104 (FIG. 1B) to stream audio content and perform other network-related functions.

Other types of bulbs may include access point bulbs and IoT bulbs (e.g., a smoke alarm bulb). To illustrate, FIG. 11C shows an access point bulb 1170 connected to the fixture 1180. Similar to the sound bulb 1110, the access point bulb 1170 may power itself using the PoE connection and also utilize this connection to form a network connection to the network 104 (FIG. 1B) to facilitate operation in the network 104 as an access point.

In some examples, certain bulbs may integrate multiple functions. For instance, an example bulb may integrate a playback device 110 and an access point 1170. As another example, a bulb may integrate an NMD 120 and a smoke/$CO^2$ alarm. Various other combinations are possible.

Within examples, multiple instances of the fixture 1180 may be installed in various locations in a home, business, or other locations to allow for installation of bulbs. For instance, a homeowner may install one or more fixtures in each room in their home in order to have convenient places to add playback or other capabilities via suitable bulbs. Similarly, a business may install fixtures throughout their site to add playback or other capabilities via suitable bulbs.

In various examples, a third-party may manufacture or otherwise produce networking equipment, such as access points (APs), routers, and/or power-over-ethernet (PoE) switches and/or injectors to be used with a media playback system, such as the media playback system 100 (FIG. 1A). The networking equipment may be in the bulb form factor discussed above. This third-party networking equipment is referred to herein as "partner" components (e.g., partner AP, partner switch). This partner networking equipment and/or the playback devices in the media playback system (e.g., the playback devices 110) may include one or more of the above-identified features to facilitate operation of the media playback system 100.

To facilitate troubleshooting, example access points and/or other networking components (e.g., PoE switches) may send state data to certain clients (e.g., Sonos playback devices and/or control devices). For instance, if one port is damaged or otherwise out of commission on a PoE switch, this state may be communicated over another port to a Sonos playback device, which may alert the user and/or the customer support of this issue.

As noted above, in some cases, certain devices, such as bulbs, may receive data and/or power over PoE from a PoE switch or PoE injector. In some cases, it may be useful to reset a PoE device (e.g., a playback device). An example PoE injector or switch may facilitate such resets by sending a specific packet or packets based on receiving instruction(s) from the media playback system 100 (FIG. 1A) to do so. Alternatively, the PoE switch may stop current delivery for a period of time, thereby causing a power reset of the PoE device. In some cases, a physical button on the partner PoE injector or switch or on the playback device may initiate such a reset process. Further example techniques related to Power-over-Ethernet in a media playback system are described in U.S. Pat. No. 7,154,381 filed on May 24, 2004, and titled "System and Method For Operating A Sensed Power Device Over Data Wiring," which is hereby incorporated by reference in its entirety.

IV. Example Networking Techniques

Figure 12:
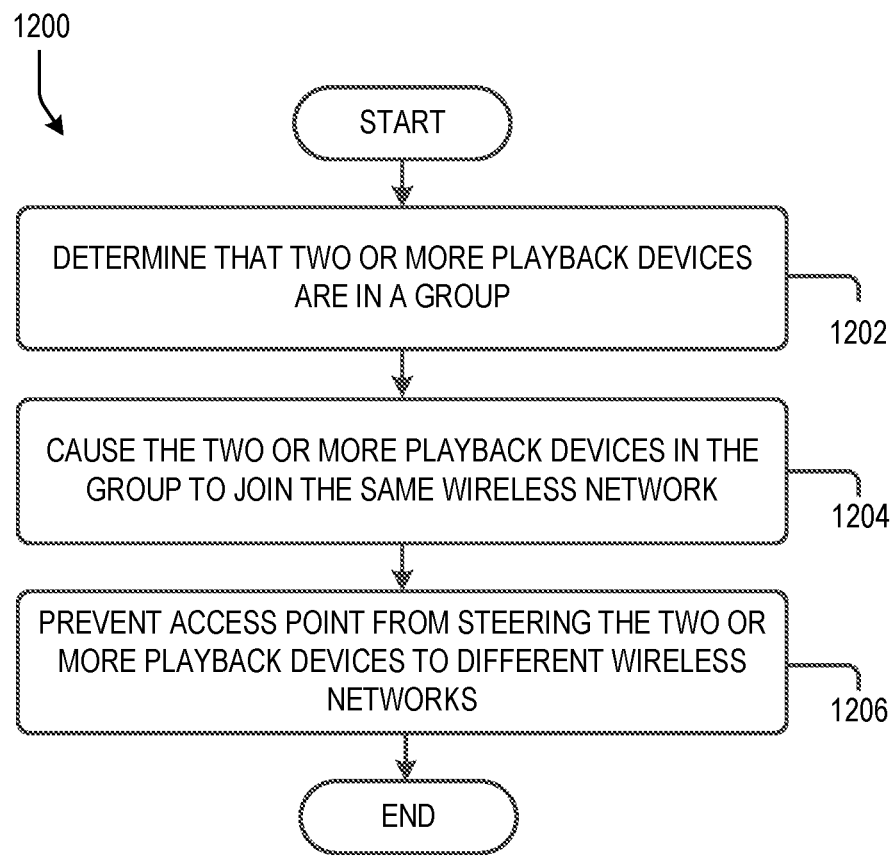
FIG. 12 is a flow diagram of an example method to manage playback devices in the presence of multiple networks in accordance with aspects of the disclosed technology.

FIG. 12 is a flow diagram showing an example method 1200 to manage playback devices in the presence of multiple networks. The method 1200 may be performed by any suitable device or by a system of devices, such as the playback devices 110, NMDs 120, control devices 130, computing devices 106, the router 760 or the mesh access point(s) 870. For purposes of illustration, the method is described as being performed by the mesh access point(s) 870 (FIGS. 8 and 9A-9C).

At block 1202, the method 1200 involves determining that two or more playback devices are in a group. For instance, the mesh access point(s) 870 may determine that a first playback device and a second playback device are in a bonded group. As discussed in connection with FIGS. 9A-9B, the mesh access point(s) 870a may determine that the playback device 110m and the playback device 110l are in stereo pair.

Within examples, the mesh access point(s) 870 may determine that the first playback device and the second playback device are in the bonded group based on a group identification. For instance, the mesh access point(s) 870 may receive data indicating respective group identifications (IDs) from the first playback device and the second playback device. Based on the group IDs, the mesh access point(s) 870 may determine that the first playback device and the second playback device (e.g., if the first playback device and the second playback device have the same group ID or are otherwise indicative of a grouping).

At block 1204, the method 1200 involves causing the two or more playback devices in the group to join the same wireless network of two or more wireless networks. For example, based on the determination, the mesh access point(s) 870 may cause the first playback device and a second playback device to join a particular wireless network. As an illustration, the mesh access point 870a may cause the playback device 110l and the playback device 110m to join the wireless network 804b (FIG. 9B).

In some examples, the mesh access point(s) 870 may receive, from at least one of the first playback device and the second playback device, one or more messages representing a request to disable steering on the bonded group. Based on receipt of the request to disable steering on the bonded group, the mesh access point(s) 870 may cause both the first playback device and the second playback device to connect to the first wireless network. For instance, the mesh access point 870*a* may disable steering on the playback device 110*l* and the playback device 110*m*, which causes the playback device 110*l* and the playback device 110*m* to join the same wireless network.

Within examples, the mesh access point(s) 870 may receive, from at least one of the first playback device and the second playback device, one or more messages representing a request to connect the first playback device and the second playback device to the same wireless network. Based on receipt of the request to connect the first playback device and the second playback device to the same wireless network, the mesh access point(s) 870 may cause both the first playback device and the second playback device to connect to the first wireless network. For instance, the mesh access point 870*a* may cause the playback device 110*l* and the playback device 110*m* to join the wireless network 804*b* based on receipt of a message from the playback device 110*l* or the playback device 110*m* representing a request to connect the playback device 110*l* or the playback device 110*m* to the same wireless network.

In further examples, the mesh access point(s) 870 may determine that (i) the first playback device has a particular group identification (ID) and (ii) the second playback device has the particular group ID. Based on the determinations, the mesh access point(s) 870 causes both the first playback device and the second playback device to connect to the first wireless network. For instance, the playback device 110*l* and the playback device 110*m* may be configured with the same group IDs in connection with their stereo pair configuration, which may cause the mesh access point 870*a* to connect the playback device 110*l* and the playback device 110*m* to the same wireless network.

At block 1206, the method 1200 involves preventing an access point from steering the two or more playback devices to different wireless networks. For example, the mesh access point(s) 870 may prevent the mesh access point(s) 870 from steering the first playback device and the second playback device to different wireless networks of the two or more wireless networks. To illustrate, the mesh access point 870*a* may prevent a steering algorithm operating on the mesh access point 870*b* from steering the playback device 110*l* and the playback device 110*m* to the mesh access point 870*b*, perhaps by disabling steering on the playback devices 110.

In an example, the mesh access point(s) 870 may detect that the first playback device is being steered to the second wireless network and, based on receipt of the request to connect the first playback device and the second playback device the same wireless network, cause both the first playback device and the second playback device to be steered to the second wireless network. For instance, as illustrated in FIG. 9C, the mesh access points 870 may steer both the playback device 110*m* and the playback device 110*l* to the mesh access point 870*b*. Yet further, the mesh access point(s) 870 may cause both the first playback device and the second playback device to be steered to the second wireless network based on the second playback device having the same particular group ID as the first playback device.

Figure 13:
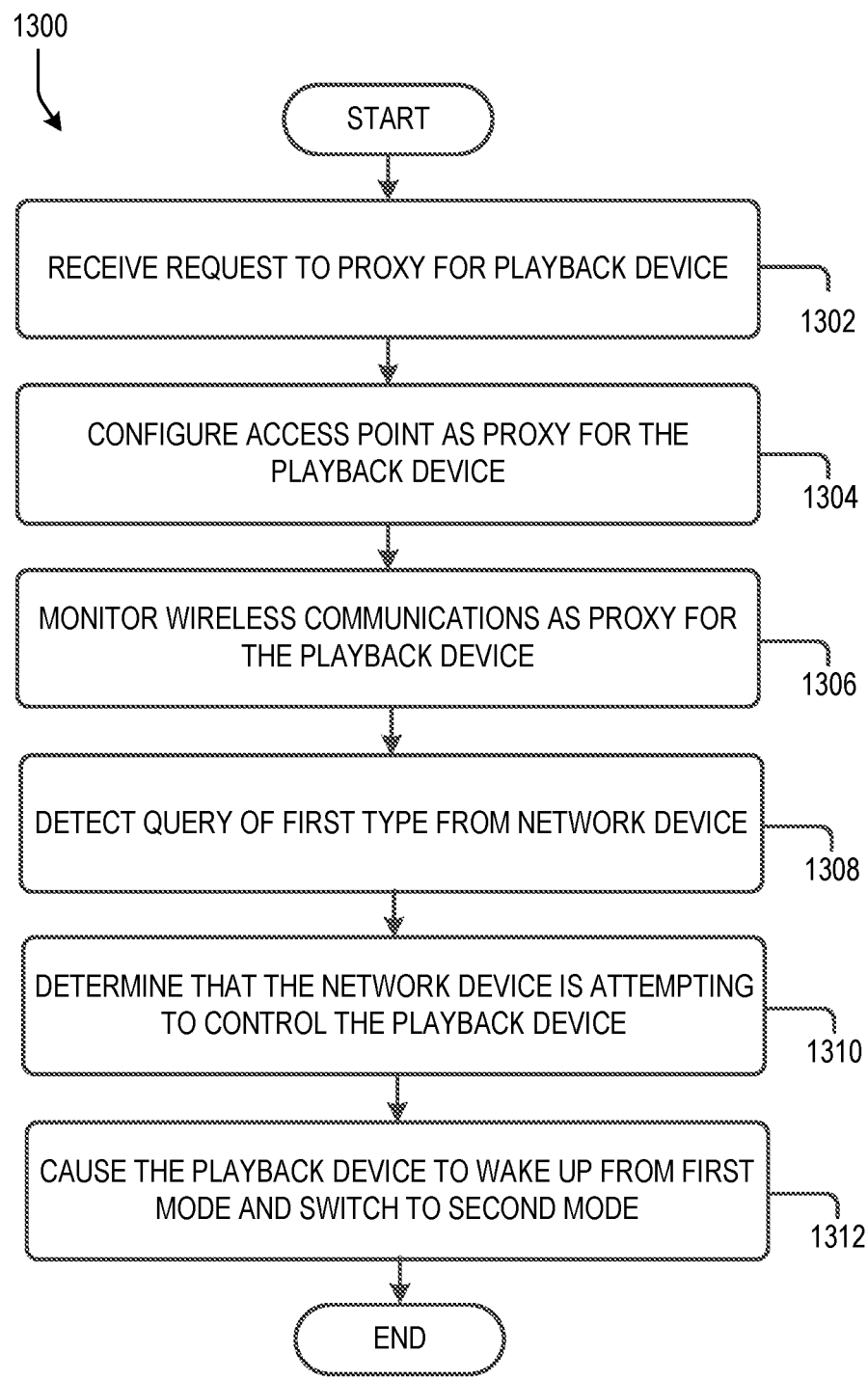
FIG. 13 is a flow diagram of an example method to proxy for a playback device in accordance with aspects of the disclosed technology.

FIG. 13 is a flow diagram showing an example method 1300 to facilitate sleep proxying. The method 1300 may be performed by any suitable device or by a system of devices, such as the playback devices 110, NMDs 120, control devices 130, computing devices 106, the router 760 or the mesh access point(s) 870. For purposes of illustration, the method is described as being performed by the mesh access point 870*a* (FIGS. 8 and 10A-10B).

At block 1302, the method 1300 involves receiving a request to proxy for a playback device. For instance, the mesh access point 870*a* may receive a request to proxy for the playback device 110*m* while the playback device 110*m* is in a first mode (FIG. 10A). The playback device 110*m* may be configured to consume less power in the first mode (e.g., a low-power or standby mode) as compared to a second mode.

At block 1304, the method 1300 involves configuring an access point as a proxy for the playback device. For example, the mesh access point 870*a* may configure itself as a sleep proxy for the playback device 110*m*. Such configuration may involve configuring the mesh access point 870*a* to monitor wireless communications for certain queries supported by the playback device 110*m*.

At block 1306, the method 1300 involves monitoring wireless communications as the proxy for the playback device. For instance, while the mesh access point 870*a* is configured as a proxy for the playback device 110*m*, the mesh access point 870*a* may, monitor, via one or more wireless radios, wireless communications for two or more types of queries including a first type of query configured to wake up network devices according to a first protocol and a second type of query configured to wake up network devices according to a second protocol. Example queries include multicast DNS queries (e.g., according to the Bonjour® sleep proxy) as well as magic packets, among other examples. Example protocols include AirPlay®; Spotify Connect®; Chromecast®; Pandora®; or a voice assistant service, such as ALEXA®, GOOGLE ASSISTANT®, SIRI®, or CORTANA®.

At block 1308, the method 1300 involves detecting a query of a first type from a network device. For example, the mesh access point 870*a* may detect an AIRPLAY® multicast DNS request 1072*a* from the control device 130*a* (FIG. 10A). As another example, the mesh access point 870*a* may detect an ALEXA® wake-up packet 1072*b* from the NMD 120*a* (FIG. 10B).

At block 1310, the method 1300 involves determining that the network device is attempting to control the playback device. For instance, the mesh access point 870*a* may determine that the control device 130*a* is attempting to control the playback device 110*m* (FIG. 10A). As another example, the mesh access point 870*a* may determine that the NMD 120*a* is not attempting to control the playback device 110*m* (FIG. 10B). The mesh access point 870*a* may use any suitable technique to make such a determination, such as the techniques discussed in connection with FIGS. 10A and 10B.

At block 1312, the method 1300 involves causing the playback device to wake up from the first mode and switch to a second mode. For example, based on (i) the detection of the query of the first type and (ii) the determination that the control device is attempting to control the playback device, the mesh access point 870*a* may cause the playback device 110*m* to wake up from the first mode and switch to the second mode. After causing the playback device 110*m* to wake up from the first mode and switch to the second mode, the mesh access point 870*a* configured to no longer proxy for the playback device 110*m*.

In some examples, causing the playback device 110*m* to wake up from the first mode and switch to the second mode may involve sending a magic packet. For instance, the mesh access point 870*a* may send the native magic packet 1074 to the playback device 110*m* (FIG. 10A). As discussed above, within examples, the playback devices 110 are configured to wake up from the first mode and switch to the second mode upon receipt of the magic packet.

Within examples, causing the playback device 110*m* to wake up from the first mode and switch to the second mode may involve sending one or more queries of a third type to the playback device. Similar to other examples, the playback device 110*m* may be configured to wake up from the first mode and switch to the second mode upon receipt of the one or more queries of a third type. Such queries may be a multicast DNS query or a magic packet, among other examples.

As discussed in the foregoing sections, the playback device 110*m* may include a network interface and a system-on-chip (SoC). In the first mode, the wireless network interface may be configured into a first state configured to detect only the one or more queries of a third type (e.g., the native magic packet 1074). Conversely, in the second mode, the SoC is configured into a second state configured to detect the one or more queries of a third type and at least one of the first type of query or the second type of query.

Within examples, the method 1300 may further involve detecting, within the monitored wireless communications, an additional query of the first type from the network device and determining that the network device is attempting to control another playback device via the first protocol. Based on (i) the detection of the query of the first type and (ii) the determination that the first network device is attempting to control another playback device, the mesh access point 870*a* may forgo causing the playback device 110*m* to wake up from the first mode and switch to the second mode. An example is illustrated in FIG. 10B.

In examples, the method 1300 may involve receiving an additional request to proxy for the playback device while the playback device 110*m* is in the first mode. The method 1300 may further involve detecting, within the monitored wireless communications, a query of the second type from an additional network device and determining that the additional network device is attempting to control the playback device via the second protocol. Based on (i) the detection of the query of the second type and (ii) the determination that the additional network device is attempting to control the playback device, the method 1300 may involve causing the playback device to wake up from the first mode and switch to the second mode.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I. First Examples of Networking in Media Playback System

Example 1: A method comprising: determining that a first playback device and a second playback device are in a bonded group, wherein the first playback device and the second playback device are configured to play back one or more respective channels of audio content in the bonded group; based on the determination, causing both the first playback device and the second playback device to connect to a first wireless network of two or more wireless networks, and preventing the at least one access point from steering the first playback device and the second playback device to different wireless networks of the two or more wireless networks Example 2: The method of Example 1, wherein causing both the first playback device and the second playback device to connect to the first wireless network comprises: receiving, from at least one of the first playback device and the second playback device, one or more messages representing a request to connect the first playback device and the second playback device to the same wireless network; and based on receiving the request to connect the first playback device and the second playback device the same wireless network, cause both the first playback device and the second playback device to connect to the first wireless network.

Example 3. The method of Example 2, wherein preventing the at least one access point from steering the first playback device and the second playback device to different wireless networks comprises: detecting that the first playback device is being steered to the second wireless network; and based on receiving the request to connect the first playback device and the second playback device the same wireless network, causing both the first playback device and the second playback device to be steered to the second wireless network.

Example 4: The method of any of Examples 1-3, wherein causing both the first playback device and the second playback device to connect to the first wireless network comprises: receiving, from at least one of the first playback device and the second playback device, one or more messages representing a request to disable steering on the bonded group; and based on receiving the request to disable steering on the bonded group, causing both the first playback device and the second playback device to connect to the first wireless network Example 5: The method of Example 4, wherein preventing the at least one access point from steering the first playback device and the second playback device to different wireless networks comprises based on receiving of the request to disable steering on the bonded group, disabling steering on the first playback device and the second playback device.

Example 6: The method of any of Example 1-5, wherein causing both the first playback device and the second playback device to connect to the first wireless network comprises determining that (i) the first playback device has a particular group identification (ID) and (ii) the second playback device has the particular group ID; and based on the determinations, causing both the first playback device and the second playback device to connect to the first wireless network.

Example 7: The method of Example 6, wherein preventing the at least one access point from steering the first playback device and the second playback device to different wireless networks comprises: detecting that the first playback device is being steered to the second wireless network; and based on the second playback device having the same particular group ID as the first playback device, causing both the first playback device and the second playback device to be steered to the second wireless network.

Example 8: The method of any of Examples 1-7, wherein the first playback device is configured to communicate one or more particular types of messages directly with the second playback device via the first wireless network and not via the at least one access point.

Example 9: The method of any of Examples 1-8, wherein the at least one access point comprises a first access point configured to provide at least the first wireless network on the first channel according to the first service set and a second access point configured to provide at least the second wireless network on the second channel according to the second service set.

Example 10: The method of any of Examples 1-9, wherein the at least one access point is configured to provide an extended service set including the first wireless network and the second wireless network.

Example 11: The method of any of Examples 1-10, wherein the bonded group is a stereo pair, and wherein the first playback device is configured to output a left channel of the audio content, and wherein the second playback device is configured to output a right channel of the audio content.

Example 12: The method of any of Examples 1-11, wherein the bonded group is a surround sound configuration, and wherein the first playback device is configured to output front channels of the audio content, the front channels comprising a center channel, a left channel, and a right channel, and wherein the second playback device is configured to output one of (a) bass frequencies of the audio content or (b) one or more rear surround channels of the audio content.

Example 13: A tangible, non-transitory, computer-readable medium having instructions stored thereon that are executable by one or more processors to cause an access point to perform the method of any one of Examples 1-12.

Example 14: An access point configured to provide two or more wireless networks including at least a first wireless network and a second wireless network, the access point comprising one or more wireless radios, one or more processors, and a tangible, non-tangible computer-readable medium having instructions stored thereon that are executable by the one or more processors to cause the access point to perform the method of any of Examples 1-12.

Example 15: A system comprising two or more playback devices, the two or more playback devices comprising at least a first playback device and a second playback device, at least one access point configured to provide two or more wireless networks including at least a first wireless network and a second wireless network, one or more wireless radios, one or more processors, and a tangible, non-tangible computer-readable medium having instructions stored thereon that are executable by the one or more processors to cause the access point to perform the method of any of Examples 1-12.

Example 16: A method comprising: receiving, via one or more wireless radios of an access point, a request to proxy for the playback device while the playback device is in a first mode, wherein the playback device is configured to consume less power while in the first mode relative to a second mode configure the access point as a proxy for the playback device; while the access point is configured as the proxy for the playback device, monitoring, via the one or more wireless radios, wireless communications for two or more types of queries including a first type of query configured to wake up network devices according to a first protocol and a second type of query configured to wake up network devices according to a second protocol; detecting, within the monitored wireless communications, a query of the first type from a network device; determining that the network device is attempting to control the playback device via the first protocol; and based on (i) detecting the query of the first type and (ii) determining that the network device is attempting to control the playback device, causing the playback device to wake up from the first mode and switch to the second mode.

Example 17: The method of Examples 16, wherein the second type of query comprises a magic packet, and wherein causing playback device to wake up from the first mode and switch to the second mode comprises sending the magic packet to the playback device, wherein the playback device is configured to wake up from the first mode and switch to the second mode upon receipt of the magic packet.

Example 18: The method of any of Examples 16-17, wherein causing the playback device to wake up from the first mode and switch to the second mode comprises sending one or more queries of a third type to the playback device, wherein the playback device is configured to wake up from the first mode and switch to the second mode upon receipt of the one or more queries of a third type.

Example 19: The method of Example 18, wherein the playback device comprises a wireless network interface and a system-on-chip (SoC), and wherein, in the first mode, the wireless network interface is configured into a first state configured to detect only the one or more queries of a third type, and wherein in the second mode, the SoC is configured into a second state configured to detect the one or more queries of a third type and at least one of the first type of query or the second type of query.

Example 20: The method of any of Examples 16-19, further comprising: detecting, within the monitored wireless communications, an additional query of the first type from the network device; determining that the network device is attempting to control another playback device via the first protocol; and based on (i) detecting the query of the first type and (ii) determining that the network device is attempting to control another playback device, forgo causing the playback device to wake up from the first mode and switch to the second mode.

Example 21: The method of any of Examples 16-20, further comprising: receiving, via the one or more wireless radios of the access point, an additional request to proxy for the playback device while the playback device is in the first mode; detecting, within the monitored wireless communications, a query of the second type from an additional network device; determining that the additional network device is attempting to control the playback device via the second protocol; and based on (i) detecting of the query of the second type and (ii) determining that the additional network device is attempting to control the playback device, causing the playback device to wake up from the first mode and switch to the second mode.

Example 22: The method of any of Examples 16-21, further comprising: after causing the playback device to wake up from the first mode and switch to the second mode, configuring the access point to no longer proxy for the playback device.

Example 23: The method of any of Examples 16-22, wherein the first protocol comprises one of: (1) AirPlay®; (2) Spotify Connect®; (3) Chromecast®; Pandora®; or a voice assistant service, and wherein the second protocol comprises another of: (1) AirPlay®; (2) Spotify Connect®; (3) Chromecast®; Pandora®; or a voice assistant service.

Example 24: The method of any of Examples 16-23, wherein the playback device comprises a system-on-a-chip (SoC) and wherein, in the first mode, the SoC is configured into one or more low-power states, and wherein in the second mode, the SoC is not configured into the one or more low-power states.

Example 25: The method of any of Examples 16-24, wherein the playback device is configured into a group with one or more additional playback device to play back audio in synchrony.

Example 26: A tangible, non-transitory, computer-readable medium having instructions stored thereon that are executable by one or more processors to cause an access point to perform the method of any one of Examples 16-25.

Example 27: An access point comprising one or more wireless radios, one or more processors, and a tangible, non-tangible computer-readable medium having instructions stored thereon that are executable by the one or more processors to cause the access point to perform the method of any of Examples 16-25.

Example 28: A system comprising a playback device, an access point comprising one or more wireless radios; one or more processors, and a tangible, non-tangible computer-readable medium having instructions stored thereon that are executable by the one or more processors to cause the access point to perform the method of any of Examples 16-25.

Example 29: A fixture comprising a Power-over-Ethernet (PoE) port and a socket configured to receive a bulb and provide data and power from the PoE port to the bulb.

Example 30: A sound bulb comprising one or more audio transducers, wherein the sound bulb is configured to be received in the fixture of Example 29.

Example 31: A system comprising: two or more fixtures, each fixture of the two or more fixtures comprising a respective Power-over-Ethernet (PoE) port and a respective socket, wherein each socket is configured to receive a respective bulb and provide data and power from the PoE port to the bulb; a first sound bulb in a first fixture of the two or more fixtures; a second sound bulb in a second fixture of the two or more fixtures, the second sound bulb comprising: one or more audio transducers; at least one processor; and at least one non-transitory computer-readable medium comprising program instructions that are executable by the at least one processor such that the second sound bulb is configured to: stream, via a PoE port of the second fixture, data representing audio content; and play back the audio content via the one or more audio transducers.

Example 32: The system of Example 31: wherein the first sound bulb comprises one or more additional audio transducers, and wherein the program instructions that are executable by the at least one processor such that the second sound bulb is configured to play back the audio content via the one or more audio transducers comprises program instructions that are executable by the at least one processor such that the second sound bulb is configured to play back the audio content in synchrony with the first sound bulb as a group.

Example 33: The system of any of Examples 31-32: wherein the program instructions that are executable by the at least one processor such that the second sound bulb is configured to play back the audio content in synchrony with the first sound bulb as a group comprises program instructions that are executable by the at least one processor such that the second sound bulb is configured to send, via the PoE port of the second fixture, timing information to the first sound bulb to synchronize the playback of the audio content.

Example 34: The system of any of Examples 31-33: further comprising an access point bulb in a third fixture of the two or more fixtures, wherein the access point bulb comprises one or more wireless radios, and wherein the access point bulb is configured to provide one or more wireless networks via the one or more wireless radios.

Example 35: The system of any of Examples 31-34: wherein the second sound bulb further comprises an access point, wherein the access point comprises one or more wireless radios, and wherein the access point is configured to provide one or more wireless networks via the one or more wireless radios.

Example 36: The system of any of Examples 31-35: wherein the first fixture comprises an access point carried in a housing of the fixture, wherein the access point comprises one or more wireless radios, and wherein the access point is configured to provide one or more wireless networks via the one or more wireless radios.

Example 37: The system of any of Examples 31-36: wherein the respective PoE ports of the two or more fixtures are connected to respective ports of a PoE switch.

Example 38: The system of any of Examples 31-37: wherein the audio content comprises a playlist of audio tracks, and wherein at least one non-transitory computer readable medium further comprises program instructions that are executable by the at least one processor such that the system is configured to: receive, via a PoE port of the second fixture from a control device, data representing instructions to play back the playlist.

Example 39: The system of any of Examples 31-38: wherein the playlist comprises uniform resource identifiers indicating respective sources of the audio tracks at one or more servers of a streaming audio service, and wherein the program instructions that are executable by the at least one processor such that the second sound bulb is configured to stream the data representing audio content comprises program instructions that are executable by the at least one processor such that the second sound bulb is configured to:

stream, via a PoE port of the second fixture, data representing audio content from the respective sources of the audio tracks at one or more servers of a streaming audio service indicated by the uniform resource identifiers.

II. Second Examples of Networking in Media Playback System

Example 1: A method comprising: receiving, via one or more wireless radios of an access point, a request to proxy for the playback device while the playback device is in a first mode, wherein the playback device is configured to consume less power while in the first mode relative to a second mode: in response to receiving the request, configuring the access point as a proxy for the playback device; while the access point is configured as the proxy for the playback device: monitoring, via the one or more wireless radios, wireless communications for two or more types of queries related to the playback device; when a query of a first type is received, the query of the first type indicating that a network device is attempting to control the playback device, causing the playback device to switch from the first mode to the second mode; and when a query of the second type is received, forgoing causing the playback device to switch from the first mode to the second mode.

Example 2: The method of Example 1, wherein the first type of query is configured to wake up network devices according to a first protocol and the second type of query is configured to wake up network devices according to a second protocol.

Example 3: The method of Example 1 or 2, wherein the first type of query indicates that the network device is attempting to control the playback device via the second protocol.

Example 4: The method of any preceding Example, wherein: the first type of query comprises a magic packet, and causing playback device to switch from the first mode to the second mode comprises sending a magic packet to the playback device, wherein the playback device is configured to switch from the first mode and to the second mode upon receipt of the magic packet from the access point.

Example 5: The method of one of Examples 1 to 4, wherein causing the playback device to switch from the first mode to the second mode comprises sending one or more queries of a third type to the playback device, wherein the playback device is configured to switch from the first mode to the second mode upon receipt of the one or more queries of a third type.

Example 6: The method of Example 5, wherein the playback device comprises a wireless network interface and a system-on-chip (SoC), and wherein, in the first mode, the wireless network interface is configured into a first state configured to detect only the one or more queries of a third type, and wherein in the second mode, the SoC is configured into a second state configured to detect the one or more queries of a third type and at least one of the first type of query or the second type of query.

Example 7: The method of any preceding Example, further comprising: when the query of the first type indicates that the network device is attempting to control a second playback device, forging causing the playback device to switch from the first mode to the second mode.

Example 8: The method of any preceding Example, further comprising: after receiving the request to proxy for the playback device, sending, to the playback device, a message indicating that the access point will proxy for the playback device.

Example 9: The method of any preceding Example, further comprising: when the query of the second type is received, sending a response to the query, in addition to forgoing causing the playback device to switch from the first mode to the second mode.

Example 10: The method of any preceding Example, wherein the query of the second type indicates that a control device is querying for available playback devices.

Example 11: The method of Example 10, further comprising: sending a response message to the query indicating that the playback device is available for playback, in addition to forgoing causing the playback device to switch from the first mode to the second mode, in response to receiving the query of the second type.

Example 12: The method of any preceding Example, further comprising: after causing the playback device to switch from the first mode to the second mode, configuring the access point to no longer proxy for the playback device.

Example 13: The method of any preceding Example, further comprising: after causing the playback device to switch from the first mode to the second mode, sending, to the playback device, a message indicating the query of the second type that was received by the access point.

Example 14: The method of any preceding Example, wherein the first protocol comprises one of: (1) AirPlay®; (2) Spotify Connect®; (3) Chromecast®; Pandora®; or a voice assistant service, and wherein the second protocol comprises another of: (1) AirPlay®; (2) Spotify Connect®; (3) Chromecast®; Pandora®; or a voice assistant service.

Example 15: The method of any preceding Example, wherein the playback device comprises a system-on-a-chip (SoC) and wherein, in the first mode, the SoC is configured into one or more low-power states, and wherein in the second mode, the SoC is not configured into the one or more low-power states.

Example 16: The method of any preceding Example, wherein the playback device is configured into a group with one or more additional playback device to play back audio in synchrony.

Example 17: he method of any preceding Example, wherein, in the first mode, the SoC is configured to switch to the second mode only when a query of the first type is received.

Example 18: The method of any preceding Example in combination with Example 2, wherein the query of the first type or the query from the second type is received from a control device configured to control playback of the playback device via one or more of the first and second protocols.

Example 19: The method of any preceding Example, further comprising: in response to determining that the access point will not continue acting as a proxy for the playback device, causing the playback device to switch from the first mode to the second mode.

Example 20: The method of any preceding Example, wherein monitoring, via the one or more wireless radios, wireless communications for two or more types of queries related to the playback device comprises listening for a query addressed to the playback device.

Example 21: The method of any preceding Example, wherein monitoring, via the one or more wireless radios, wireless communications for two or more types of queries related to the playback device comprises listening for a multicast query related to the playback device.

Example 22: A tangible, non-transitory, computer-readable medium having instructions stored thereon that are executable by one or more processors to cause an access point to perform the method of any one of Examples 1-21.

Example 23: An access point comprising one or more wireless radios, one or more processors, and a tangible, non-tangible computer-readable medium having instructions stored thereon that are executable by the one or more processors to cause the access point to perform the method of any one of Examples 1-21.

Example 24: A system comprising a playback device, an access point comprising one or more wireless radios; one or more processors, and a tangible, non-tangible computer-readable medium having instructions stored thereon that are executable by the one or more processors to cause the access point to perform the method any one of Examples 1-21.

Example 25: A method for a playback device, comprising: before switching to a first mode from a second mode, wherein, in the first mode, the playback device consumes less power than in the second mode, sending, to an access point, a message indicating that the access point is to act as a proxy for the first playback device while the first playback device is in the first power mode; after sending the message, switching to the first mode from the second mode, wherein, in the first mode, the playback device does not respond to received messages other than messages of a particular type configured to cause the playback device to switch from the first mode to the second mode; receiving, from the access point, a message from the access point of the particular type configured to cause the playback device to switch from the first mode to the second mode; in response to receiving the message from the access point of the particular type, switching from the first mode to the second mode; and while in the second mode, configuring the playback device to respond to one or more types of messages other than the message of the particular type configured to cause the playback device to switch from the first mode to the second mode.

Example 26: The method of Example 25, further comprising, after switching to the second mode from the first mode, sending, to the access point, a message indicating that the playback device is in the second mode.

Example 27: The method of any of Examples 25-26, further comprising: after sending the message indicating that the playback device is in the second mode, receiving, from the access point, a message indicating the query that triggered the access point to send the message of the particular type that caused the playback device to switch to the second mode from the first mode.

Example 28: The method of Examples 27, wherein the message indicating the query further indicates the protocol via which the query was received, and wherein the message sent to the control device indicating that the playback device is available to be controlled is sent using the protocol via which the query was received.

Example 29: The method of any of Examples 25-28, further comprising, after receiving the message of the particular type and switching to the second mode, sending, to a control device, a message indicating that the playback device is available to be controlled.

Example 30: The method of any of Examples 25-29, wherein, in the first mode, the playback device does not monitor for messages other than messages of a particular type.

Example 31: A tangible, non-transitory, computer-readable medium having instructions stored thereon that are executable by one or more processors to cause an playback device to perform the method of any one of Examples 25-30.

Example 32: A playback device comprising one or more one or more network interfaces, one or more processors, and a tangible, non-tangible computer-readable medium having instructions stored thereon that are executable by the one or more processors to cause the playback device to perform the method of any one of Examples 25-30.

Example 33: A system comprising a playback device, an access point comprising one or more wireless radios; one or more processors, and a tangible, non-tangible computer-readable medium having instructions stored thereon that are executable by the one or more processors to cause the playback device to perform the method any one of Examples 25-30.

We claim:

1. A system comprising:
   two or more playback devices, the two or more playback devices comprising at least a first playback device and a second playback device;
   at least one wireless access point configured to provide two or more wireless networks, the two or more wireless networks comprising at least a first wireless network with a first service set including a first channel and a second wireless network with a second service set including a second channel, wherein the at least one wireless access point is configured to steer wireless clients including the two or more playback devices between the two or more wireless networks;
   at least one processor; and
   at least one tangible, non-transitory computer-readable medium comprising program instructions that are executable by the at least one processor such that the at least one wireless access point is configured to:
   determine that the first playback device and the second playback device are in a bonded group, wherein the first playback device and the second playback device are configured to play back one or more respective channels of audio content in the bonded group; and
   based on the determination that the first playback device and the second playback device are in the bonded group, (i) cause both the first playback device and the second playback device to connect to the first wireless network, and (ii) while the first playback device and the second playback device are in the bonded group, prevent the at least one wireless access point from steering the first playback device from the first wireless network to the second wireless network without the second playback device, thereby avoiding a scenario where the first playback device and the second playback device are connected to different wireless networks while configured in the bonded group.

2. The system of claim 1, wherein the program instructions that are executable by the at least one processor such that the at least one wireless access point is configured to cause both the first playback device and the second playback device to connect to the first wireless network comprise program instructions that are executable by the at least one processor such that the at least one wireless access point is configured to:

receive, from at least one of the first playback device and the second playback device, one or more messages representing a request to connect the first playback device and the second playback device to the same wireless network; and based on receipt of the request to connect the first playback device and the second playback device the same wireless network, cause both the first playback device and the second playback device to connect to the first wireless network.

3. The system of claim 2, wherein the program instructions that are executable by the at least one processor such that the at least one wireless access point is configured to prevent the at least one wireless access point from steering the first playback device from the first wireless network to the second wireless network without the second playback device comprise program instructions that are executable by the at least one processor such that the at least one wireless access point is configured to:

detect that the first playback device is being steered to the second wireless network; and based on receipt of the request to connect the first playback device and the second playback device the same wireless network, cause both the first playback device and the second playback device to be steered to the second wireless network.

4. The system of claim 1, wherein the program instructions that are executable by the at least one processor such that the at least one wireless access point is configured to cause both the first playback device and the second playback device to connect to the first wireless network comprise program instructions that are executable by the at least one processor such that the at least one wireless access point is configured to:

receive, from at least one of the first playback device and the second playback device, one or more messages representing a request to disable steering on the bonded group; and based on receipt of the request to disable steering on the bonded group, cause both the first playback device and the second playback device to connect to the first wireless network.

5. The system of claim 4, wherein the program instructions that are executable by the at least one processor such that the system is configured to prevent the at least one wireless access point from steering the first playback device from the first wireless network to the second wireless network without the second playback device comprise program instructions that are executable by the at least one processor such that the at least one wireless access point is configured to:

based on receipt of the request to disable steering on the bonded group, disable steering on the first playback device and the second playback device.

6. The system of claim 1, wherein the program instructions that are executable by the at least one processor such that the at least one wireless access point is configured to cause both the first playback device and the second playback device to connect to the first wireless network comprise program instructions that are executable by the at least one processor such that the at least one wireless access point is configured to:

determine that (i) the first playback device has a particular group identification (ID) and (ii) the second playback device has the particular group ID; and based on the determinations, cause both the first playback device and the second playback device to connect to the first wireless network.

7. The system of claim 6, wherein the program instructions that are executable by the at least one processor such that the at least one wireless access point is configured to prevent the at least one wireless access point from steering the first playback device from the first wireless network to the second wireless network without the second playback device comprise program instructions that are executable by the at least one processor such that the at least one wireless access point is configured to:

detect that the first playback device is being steered to the second wireless network; and based on the second playback device having the same particular group ID as the first playback device, cause both the first playback device and the second playback device to be steered to the second wireless network.

8. The system of claim 1, wherein the first playback device is configured to communicate one or more particular types of messages directly with the second playback device via the first wireless network and not via the at least one wireless access point.

9. The system of claim 1, wherein the at least one wireless access point comprises a first wireless access point configured to provide at least the first wireless network on the first channel according to the first service set and a second wireless access point configured to provide at least the second wireless network on the second channel according to the second service set.

10. The system of claim 9, wherein the at least one wireless access point is configured to provide an extended service set including the first wireless network and the second wireless network.

11. The system of claim 1, wherein the bonded group is a stereo pair, and wherein the first playback device is configured to output a left channel of the audio content, and wherein the second playback device is configured to output a right channel of the audio content.

12. The system of claim 1, wherein the bonded group is a surround sound configuration, and wherein the first playback device is configured to output front channels of the audio content, the front channels comprising a center channel, a left channel, and a right channel, and wherein the second playback device is configured to output one of (a) bass frequencies of the audio content or (b) one or more rear surround channels of the audio content.

13. A wireless access point comprising:

two or more wireless radios;

at least one processor; and at least one tangible, non-transitory computer-readable medium comprising program instructions that are executable by the at least one processor such that the wireless access point is configured to:

provide, via the two or more wireless radios, two or more wireless networks, the two or more wireless networks comprising at least a first wireless network with a first service set including a first channel and a second wireless network with a second service set including a second channel, wherein the wireless access point is configured to steer wireless clients including two or more playback devices between the two or more wireless networks, wherein the two or more playback devices comprise a first playback device and a second playback device;

determine that the first playback device and the second playback device are in a bonded group, wherein the first playback device and the second playback device are configured to play back one or more respective channels of audio content in the bonded group; and based on the determination that the first playback device and the second playback device are in the bonded group, (i) cause both the first playback device and the second playback device to connect to the first wireless network, and (ii) while the first playback device and the second playback device are in the bonded group, prevent the wireless access point from steering the first playback device from the first wireless network to the second wireless network without the second playback device, thereby avoiding a scenario where the first playback device and the second playback device are connected to different wireless networks while configured in the bonded group.

14. The wireless access point of claim 13, wherein the program instructions that are executable by the at least one processor such that the wireless access point is configured to cause both the first playback device and the second playback device to connect to the first wireless network comprise program instructions that are executable by the at least one processor such that the wireless access point is configured to:

receive, from at least one of the first playback device and the second playback device, one or more messages representing a request to connect the first playback device and the second playback device to the same wireless network; and based on receipt of the request to connect the first playback device and the second playback device the same wireless network, cause both the first playback device and the second playback device to connect to the first wireless network.

15. The wireless access point of claim 14, wherein the program instructions that are executable by the at least one processor such that the wireless access point is configured to configured to prevent the wireless access point from steering the first playback device from the first wireless network to the second wireless network without the second playback device comprise program instructions that are executable by the at least one processor such that the wireless access point is configured to:

detect that the first playback device is being steered to the second wireless network; and based on receipt of the request to connect the first playback device and the second playback device the same wireless network, cause both the first playback device and the second playback device to be steered to the second wireless network.

16. The wireless access point of claim 13, wherein the program instructions that are executable by the at least one processor such that the wireless access point is configured to cause both the first playback device and the second playback device to connect to the first wireless network comprise program instructions that are executable by the at least one processor such that the wireless access point is configured to:

receive, from at least one of the first playback device and the second playback device, one or more messages representing a request to disable steering on the bonded group; and based on receipt of the request to disable steering on the bonded group, cause both the first playback device and the second playback device to connect to the first wireless network.

17. The wireless access point of claim 16, wherein the program instructions that are executable by the at least one processor such that the wireless access point is configured to prevent the wireless access point from steering the first playback device from the first wireless network to the second wireless network without the second playback device comprise program instructions that are executable by the at least one processor such that the wireless access point is configured to:

based on receipt of the request to disable steering on the bonded group, disable steering on the first playback device and the second playback device.

18. The wireless access point of claim 13, wherein the program instructions that are executable by the at least one processor such that the wireless access point is configured to cause both the first playback device and the second playback device to connect to the first wireless network comprise program instructions that are executable by the at least one processor such that the wireless access point is configured to:

determine that (i) the first playback device has a particular group identification (ID) and (ii) the second playback device has the particular group ID; and based on the determinations, cause both the first playback device and the second playback device to connect to the first wireless network.

19. The wireless access point of claim 18, wherein the program instructions that are executable by the at least one processor such that the wireless access point is configured to prevent the wireless access point from steering the first playback device from the first wireless network to the second wireless network without the second playback device comprise program instructions that are executable by the at least one processor such that the wireless access point is configured to:

detect that the first playback device is being steered to the second wireless network; and based on the second playback device having the same particular group ID as the first playback device, cause both the first playback device and the second playback device to be steered to the second wireless network.

20. A method comprising:

providing, via at least one wireless access point comprising two or more wireless radios, two or more wireless networks, the two or more wireless networks comprising at least a first wireless network with a first service set including a first channel and a second wireless network with a second service set including a second channel, wherein the at least one access wireless point is configured to steer wireless clients including two or more playback devices between the two or more wireless networks, wherein the two or more playback device comprise a first playback device and a second playback device;

determining, via the at least one wireless access point, that the first playback device and the second playback device are in a bonded group, wherein the first playback device and the second playback device are configured to play back one or more respective channels of audio content in the bonded group; and based on the determination that the first playback device and the second playback device are in the bonded group, the at least one wireless access point, (i) causing both the first playback device and the second playback device to connect to the first wireless network, and (ii) preventing the at least one wireless access point from steering the first playback device from the first wireless network to the second wireless network without the second playback device, thereby avoiding a scenario where the first playback device and the second playback device are connected to different wireless networks while configured in the bonded group.

* * * * *